(12) United States Patent
Bisaiji et al.

(10) Patent No.: US 9,617,893 B2
(45) Date of Patent: Apr. 11, 2017

(54) EXHAUST PURIFICATION SYSTEM FOR AN INTERNAL COMBUSTION ENGINE

(71) Applicant: TOYOTA JIDOSHA KABUSHIKI KAISHA, Toyota-shi, Aichi-ken (JP)

(72) Inventors: Yuki Bisaiji, Mishima (JP); Kohei Yoshida, Gotenba (JP); Yuki Haba, Mishima (JP); Yusuke Nozaki, Gotenba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/914,386

(22) PCT Filed: Jul. 3, 2014

(86) PCT No.: PCT/JP2014/068374
§ 371 (c)(1),
(2) Date: Feb. 25, 2016

(87) PCT Pub. No.: WO2015/029612
PCT Pub. Date: Mar. 5, 2015

(65) Prior Publication Data
US 2016/0201538 A1    Jul. 14, 2016

(30) Foreign Application Priority Data

Aug. 26, 2013   (JP) ................. 2013-174637

(51) Int. Cl.
*F01N 3/20*    (2006.01)
*F01N 9/00*    (2006.01)
(Continued)

(52) U.S. Cl.
CPC ......... *F01N 3/2066* (2013.01); *F01N 3/0814* (2013.01); *F01N 3/0842* (2013.01);
(Continued)

(58) Field of Classification Search
CPC .. F01N 3/0842; F01N 3/0871; F01N 2430/06; F01N 2560/06; F01N 2570/14;
(Continued)

(56) References Cited

U.S. PATENT DOCUMENTS

2012/0124971 A1* 5/2012 Bisaiji ............... B01D 53/9422
60/286
2014/0007557 A1   1/2014 Bisaiji et al.

FOREIGN PATENT DOCUMENTS

JP        4868096 B2    2/2012
WO    2011/114501 A1    9/2011

* cited by examiner

*Primary Examiner* — Jonathan Matthias
(74) *Attorney, Agent, or Firm* — Oliff PLC

(57) ABSTRACT

In an internal combustion engine, a hydrocarbon feed valve and an exhaust purification catalyst are arranged in an engine exhaust passage. A first $NO_X$ removal method which reduces $NO_X$ contained in an exhaust gas by a reducing intermediate which is generated by injecting hydrocarbons from the hydrocarbon feed valve within a predetermined range of period and a second $NO_X$ removal method in which an air-fuel ratio of the exhaust gas flowing into the exhaust purification catalyst is made rich by a period which is longer than this predetermined range are used. The switching temperatures ST and $ST_0$ of the exhaust purification catalyst at which temperature an $NO_X$ removal method is switched from the second $NO_X$ removal method to the first $NO_X$ removal method, are made lower if the amount of $NO_X$ in the exhaust gas flowing into the exhaust purification catalyst increases.

10 Claims, 23 Drawing Sheets

(51) Int. Cl.
*F01N 3/08* (2006.01)
*F01N 3/021* (2006.01)

(52) U.S. Cl.
CPC ............. *F01N 3/0871* (2013.01); *F01N 9/00* (2013.01); *F01N 3/021* (2013.01); *F01N 2240/30* (2013.01); *F01N 2430/06* (2013.01); *F01N 2560/06* (2013.01); *F01N 2610/03* (2013.01); *F01N 2900/08* (2013.01); *F01N 2900/1402* (2013.01); *F01N 2900/1602* (2013.01); *Y02T 10/47* (2013.01)

(58) Field of Classification Search
CPC ......... F01N 2610/03; F01N 2900/1404; F01N 2900/1602; F01N 2900/1626
See application file for complete search history.

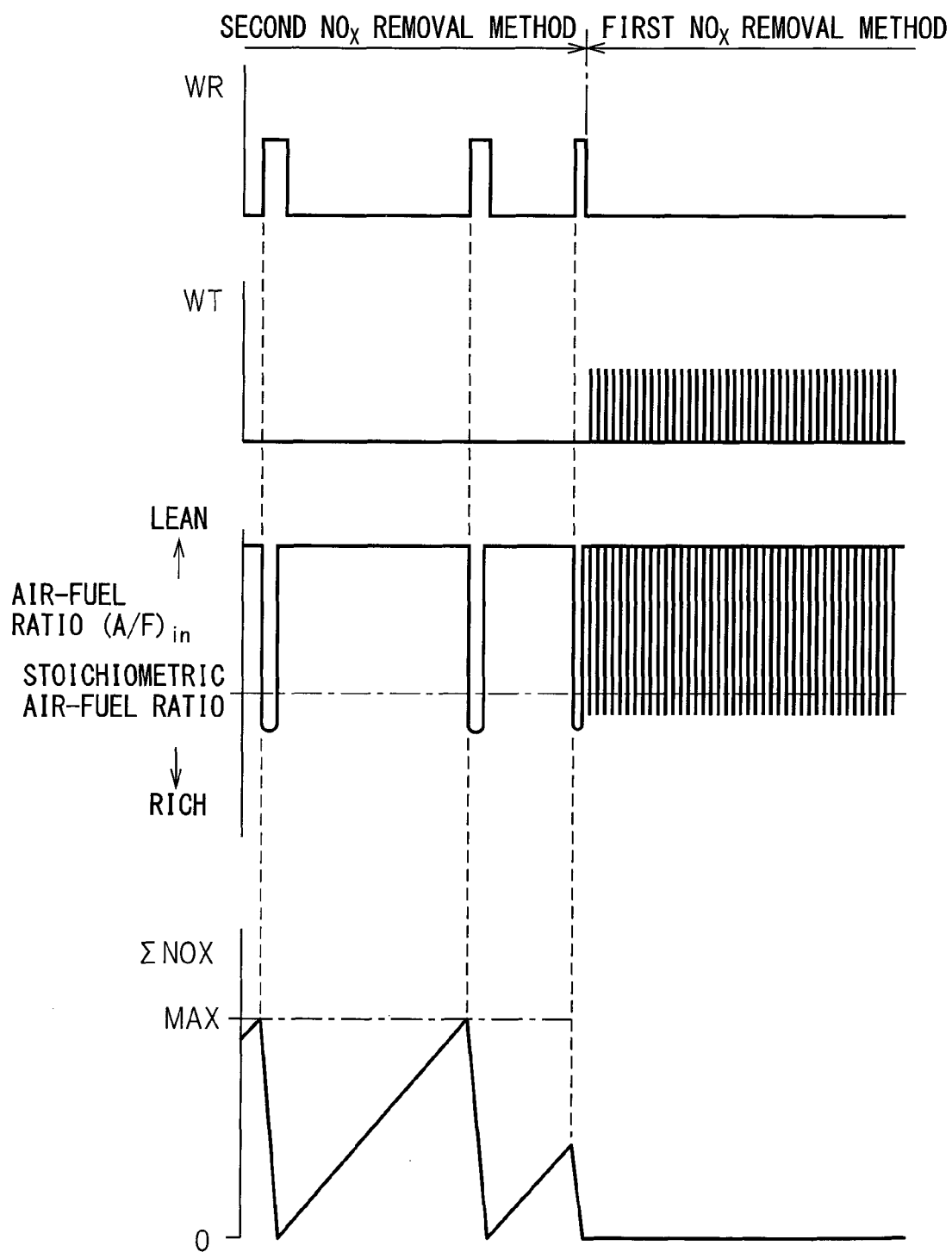

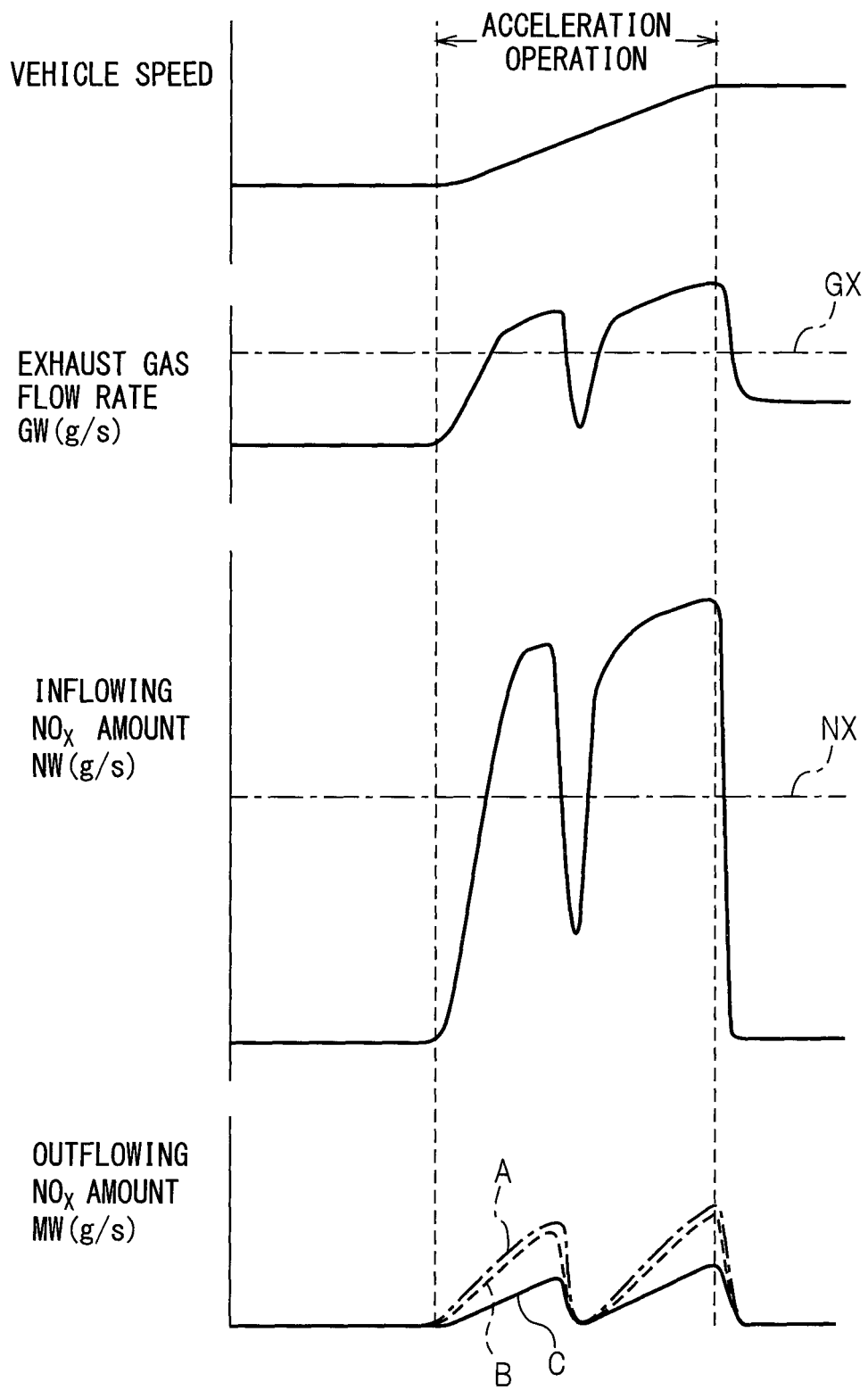

EXHAUST PURIFICATION SYSTEM FOR AN INTERNAL COMBUSTION ENGINE

TECHNICAL FIELD

The present invention relates to an exhaust purification system of an internal combustion engine.

BACKGROUND ART

Known in the art is an internal combustion engine in which an exhaust purification catalyst is arranged in an engine exhaust passage, a hydrocarbon feed valve is arranged in the engine exhaust passage upstream of the exhaust purification catalyst, a precious metal catalyst is carried on an exhaust gas flow surface of the exhaust purification catalyst, a basic layer is formed around the precious metal catalyst, and a first $NO_x$ removal method which reduces $NO_x$ contained in an exhaust gas by a reducing intermediate which is held on the basic layer and generated by injecting hydrocarbons from the hydrocarbon feed valve within a predetermined range of period and a second $NO_x$ removal method in which an air-fuel ratio of the exhaust gas flowing into the exhaust purification catalyst is made rich by a period which is longer than the above-mentioned predetermined range to make $NO_x$ which was stored in the exhaust purification catalyst when the air-fuel ratio of the exhaust gas was lean be released from the exhaust purification catalyst and be reduced are used (for example, see PTL 1).

CITATION LIST

Patent Literature

PTL 1. WO2011/114501

SUMMARY OF INVENTION

Technical Problem

In this regard, in this internal combustion engine, when the first $NO_x$ removal method is being used, as explained above, the $NO_x$ contained in the exhaust gas is reduced by the reducing intermediate which is held on the basic layer, and the amount of hydrocarbons which is required for generating this reducing intermediate is fed from the hydrocarbon feed valve. On the other hand, when the second $NO_x$ removal method is being used, the stored $NO_x$ is released from the exhaust purification catalyst and reduced by making the air-fuel ratio of the exhaust gas flowing into the exhaust purification catalyst rich. In this regard, to make the $NO_x$ which was once stored in the exhaust purification catalyst be released from the exhaust purification catalyst and be reduced in this way, a large amount of reducing agent becomes necessary. Therefore, the amount of reducing agent which is required for releasing the stored $NO_x$ from the exhaust purification catalyst and reduce it in the second $NO_x$ removal method, that is, the amount of fuel which is required for making the air-fuel ratio of the exhaust gas rich, is larger compared with the amount of hydrocarbons, that is, the amount of reducing agent, which is required for generating the reducing intermediate in the first $NO_x$ removal method. That is, the amount of reducing agent which is required for removing the $NO_x$ is greater in the case of using the second $NO_x$ removal method compared with the case of using the first $NO_x$ removal method. Therefore, it is preferable to use the first $NO_x$ removal method as much as possible.

In this regard, the first $NO_x$ removal method gives a high purification efficiency at the higher side of temperature of the exhaust purification catalyst compared with the second $NO_x$ removal method. Therefore, if the temperature of the exhaust purification catalyst rises, an $NO_x$ removal method is switched from the second $NO_x$ removal method to the first $NO_x$ removal method. In this case, as explained above, it is preferable to use the first $NO_x$ removal method as much as possible, so the temperature of the exhaust purification catalyst when an $NO_x$ removal method is switched from the second $NO_x$ removal method to the first $NO_x$ removal method is preferably as low as possible. However, it was learned that the allowable lower limit temperature of the exhaust purification catalyst which gives a good $NO_x$ removal rate using the first $NO_x$ removal method is affected by the amount of $NO_x$ which is contained in the exhaust gas and that this allowable lower limit temperature becomes lower the more the amount of $NO_x$ which is contained in the exhaust gas increases. The reason will be explained in detail later.

Note that, in the above-mentioned known internal combustion engine, an $NO_x$ removal method is switched from the second $NO_x$ removal method to the first $NO_x$ removal method by using a different judgment criteria from the present invention.

Solution to Problem

Therefore, in the present invention, there is provided an exhaust purification system of an internal combustion engine comprising an exhaust purification catalyst arranged in an engine exhaust passage and a hydrocarbon feed valve arranged in the engine exhaust passage upstream of the exhaust purification catalyst, a precious metal catalyst being carried on an exhaust gas flow surface of the exhaust purification catalyst, a basic layer being formed around the precious metal catalyst, a first $NO_x$ removal method which reduces $NO_x$ contained in an exhaust gas by a reducing intermediate which is held on the basic layer and generated by injecting hydrocarbons from the hydrocarbon feed valve within a predetermined range of period and a second $NO_x$ removal method in which an air-fuel ratio of the exhaust gas flowing into the exhaust purification catalyst is made rich by a period which is longer than the above-mentioned predetermined range to make $NO_x$ which was stored in the exhaust purification catalyst when the air-fuel ratio of the exhaust gas was lean be released from the exhaust purification catalyst and be reduced being used, wherein $NO_x$ removal method switching means is provided for switching an $NO_x$ removal method from the second $NO_x$ removal method to the first $NO_x$ removal method when a temperature of the exhaust purification catalyst rises and exceeds a predetermined switching temperature, the $NO_x$ removal method switching means controls the switching temperature in accordance with an amount of $NO_x$ in the exhaust gas flowing into the exhaust purification catalyst, which amount of $NO_x$ changes in accordance with an engine operating state, and the switching temperature is made lower if the amount of $NO_x$ in the exhaust gas flowing into the exhaust purification catalyst increases at least when the amount of $NO_x$ in an inflowing exhaust gas is in a range of change at a small amount side within a range of change of the amount of $NO_x$ in the inflowing exhaust gas.

Advantageous Effects of Invention

When the amount of $NO_x$ in the exhaust gas flowing into the exhaust purification catalyst is increased, it is possible to obtain a good $NO_x$ purification action while decreasing the amount of consumption of the reducing agent by lowering the switching temperature of the exhaust purification catalyst at which temperature an $NO_x$ removal method is switched from the second $NO_x$ removal method to the first $NO_x$ removal method.

7A and 7B are views for explaining an oxidation reduction reaction in an exhaust purification catalyst.

Figure 8:
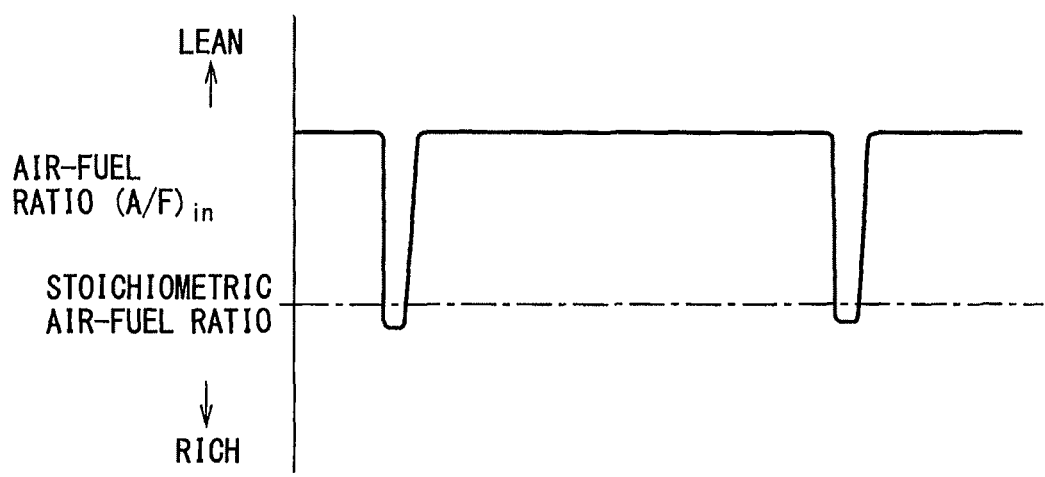

FIG. 8 is a view which shows changes in an air-fuel ratio of exhaust gas which flows into an exhaust purification catalyst.

Figure 9:
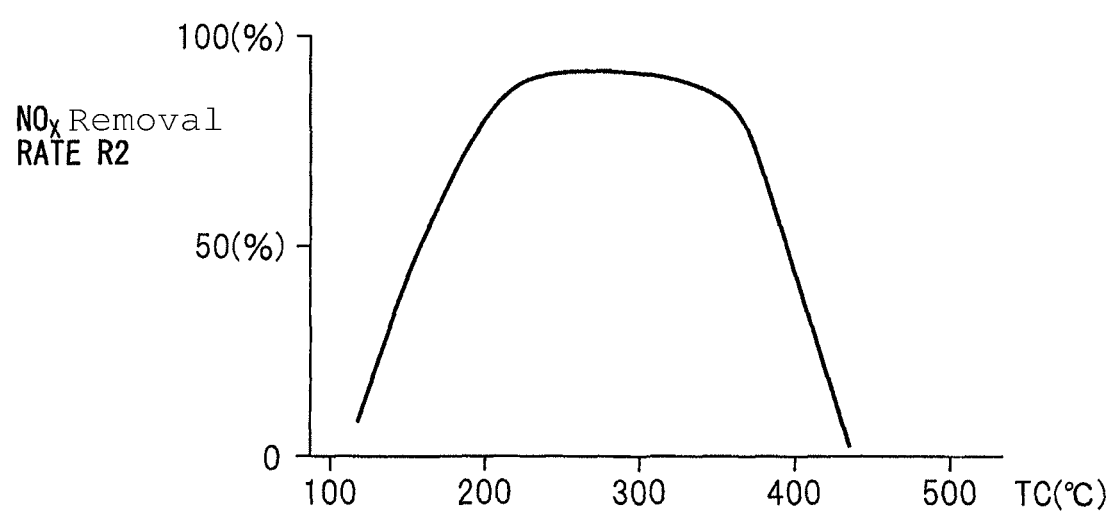

FIG. 9 is a view which shows an $NO_x$ removal rate R2.

Figure 10A:
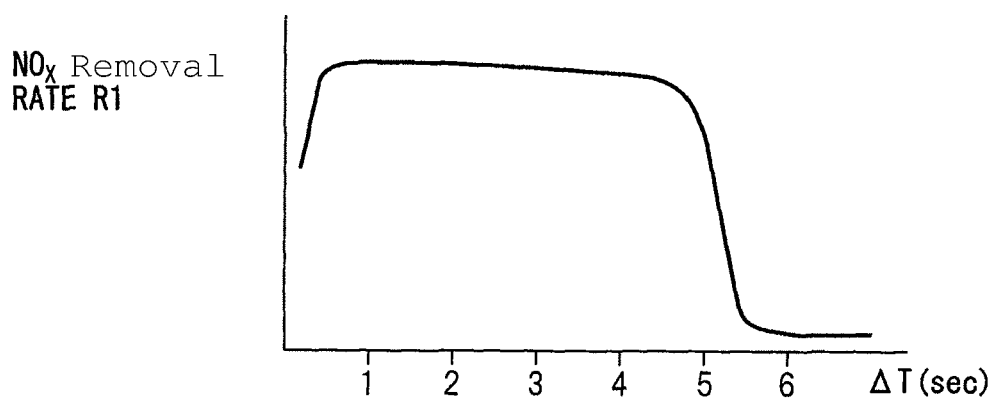
Figure 10B:
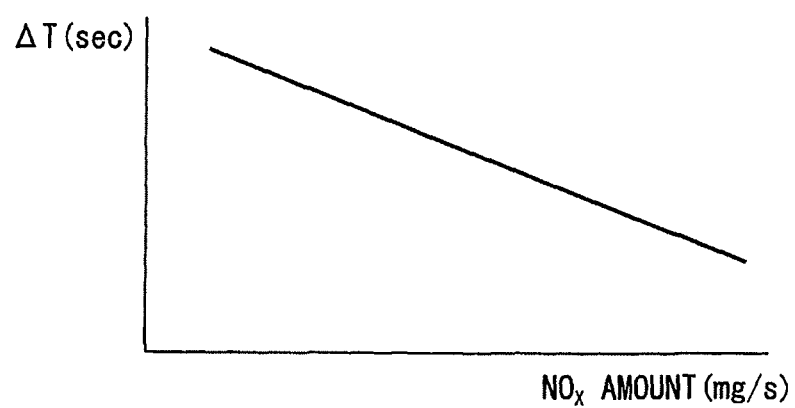

FIGS. 10A and 10B are views which show a relationship between a vibration period $\Delta T$ of hydrocarbon concentration and an $NO_x$ removal rate R1, etc.

Figure 11A:
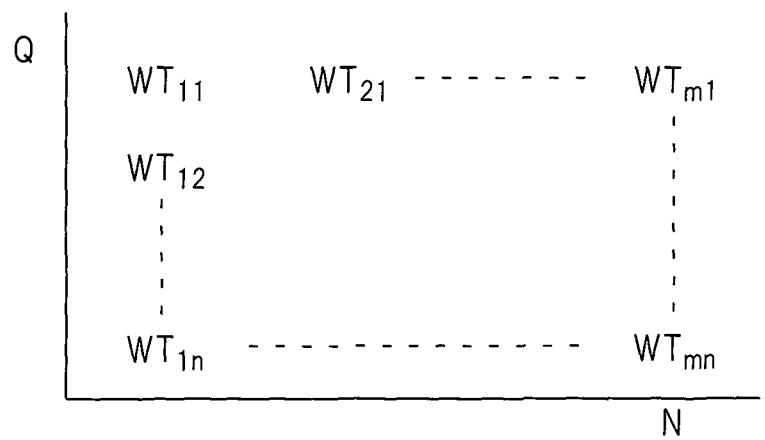
Figure 11B:
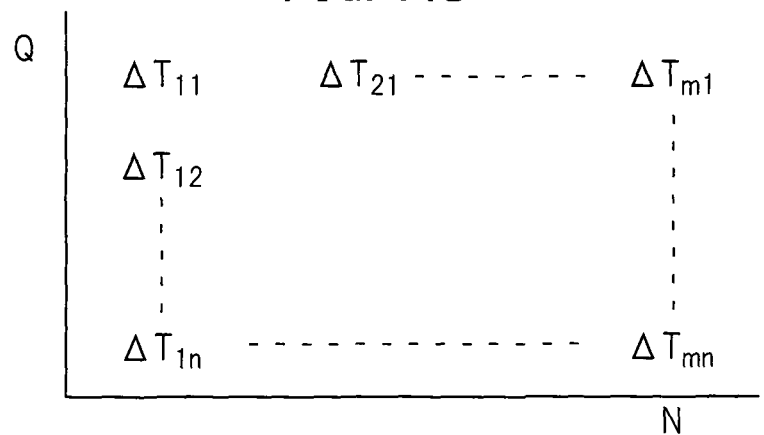
Figure 11C:
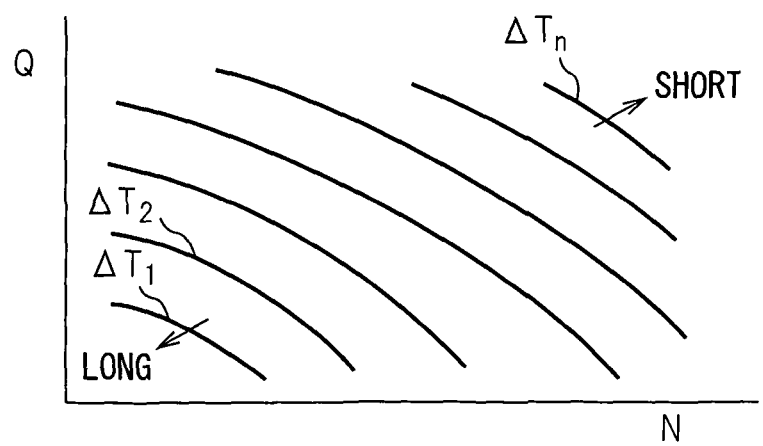

FIGS. 11A, 11B and 11C are views which show maps of the injection amount of hydrocarbons, etc.

Figure 12:
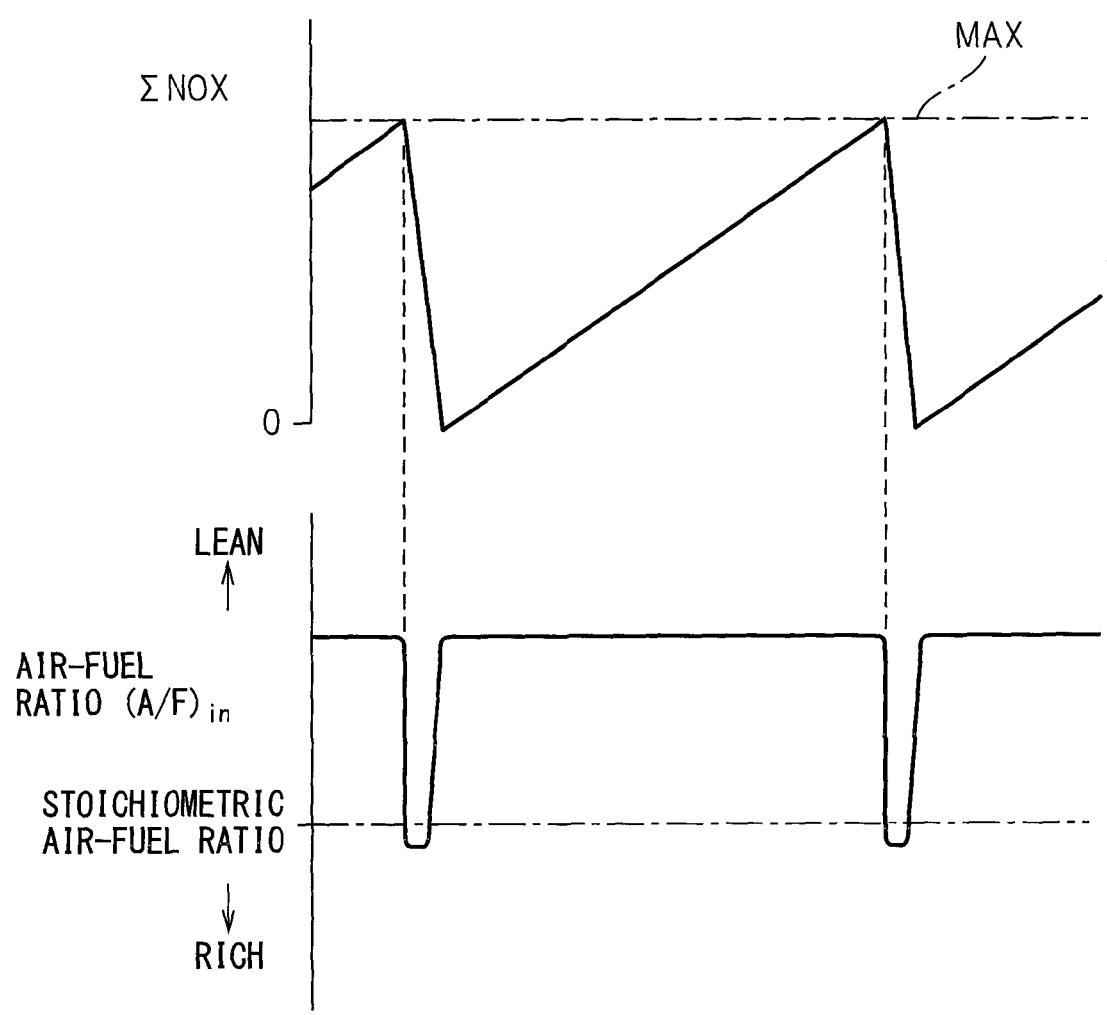

FIG. 12 is a view which shows an $NO_x$ release control.

Figure 13:
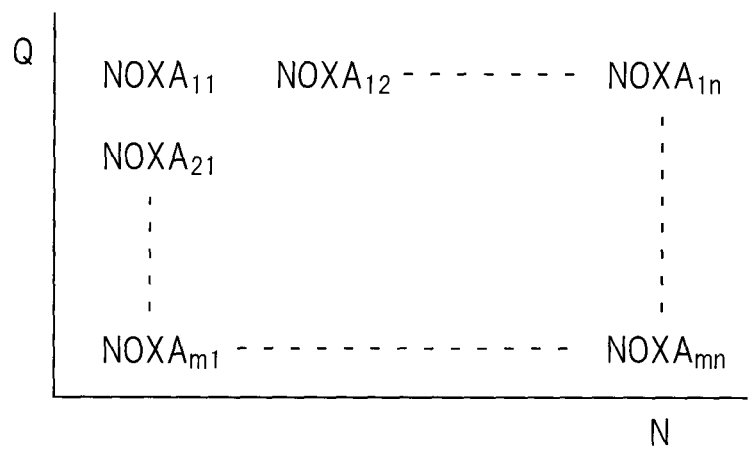

FIG. 13 is a view which shows a map of an exhausted $NO_x$ amount NOXA.

Figure 14:
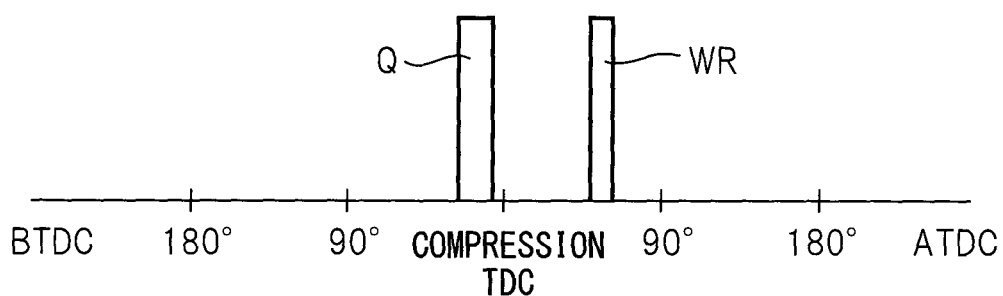

FIG. 14 is a view which shows a fuel injection timing.

Figure 15:
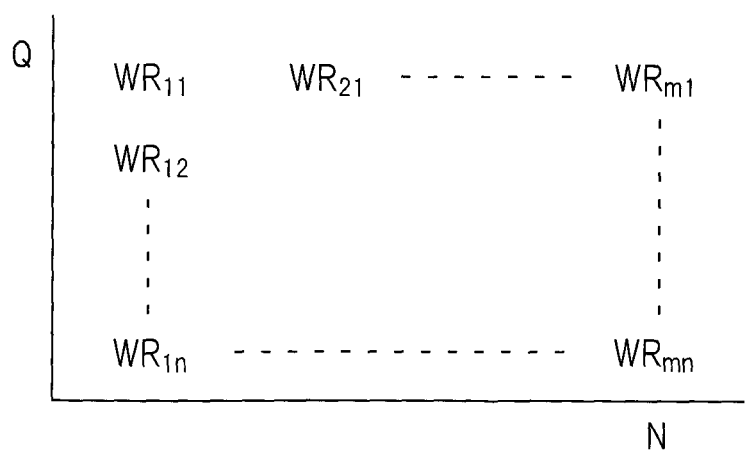

FIG. 15 is a view which shows a map of an additional hydrocarbon feed amount WR.

Figure 16:
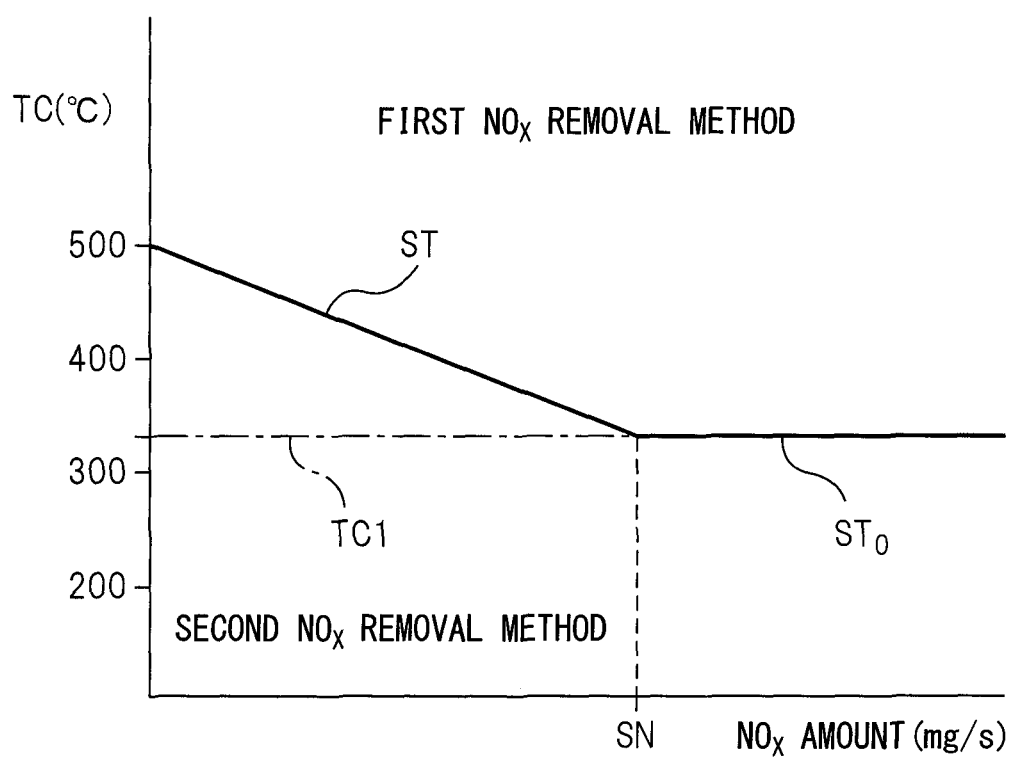

FIG. 16 is a view which shows switching temperatures ST and $ST_0$.

Figure 17:
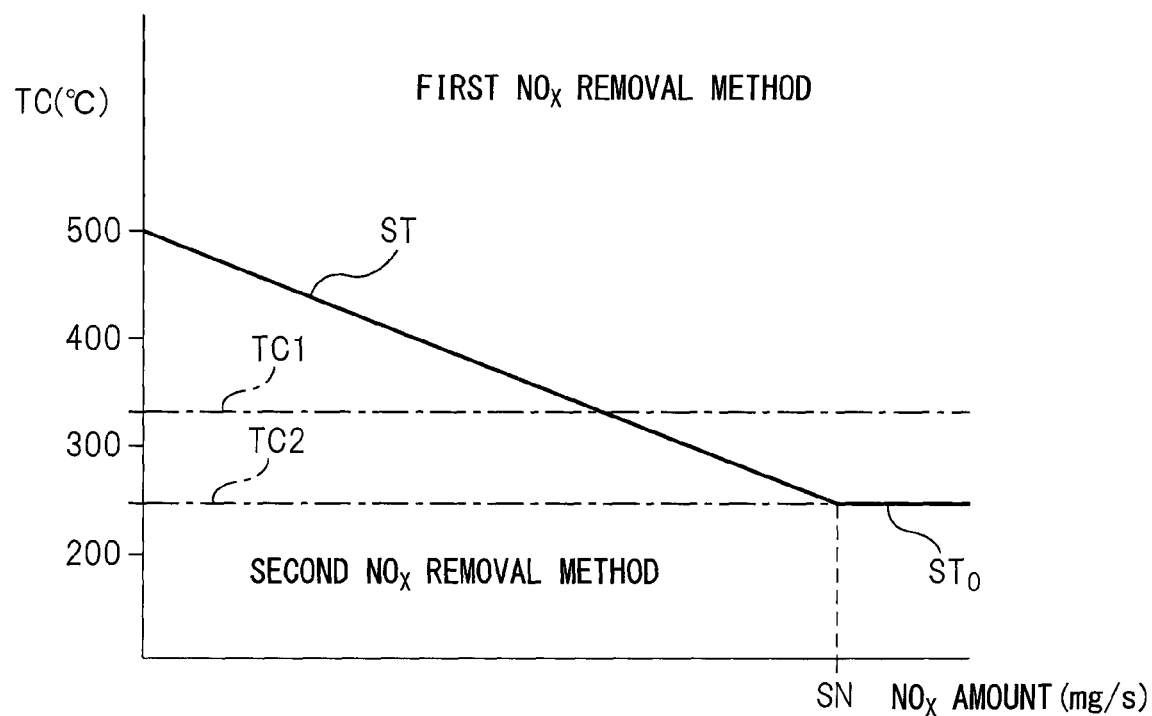

FIG. 17 is a view which shows another embodiment of switching temperatures ST and $ST_0$.

Figure 18:
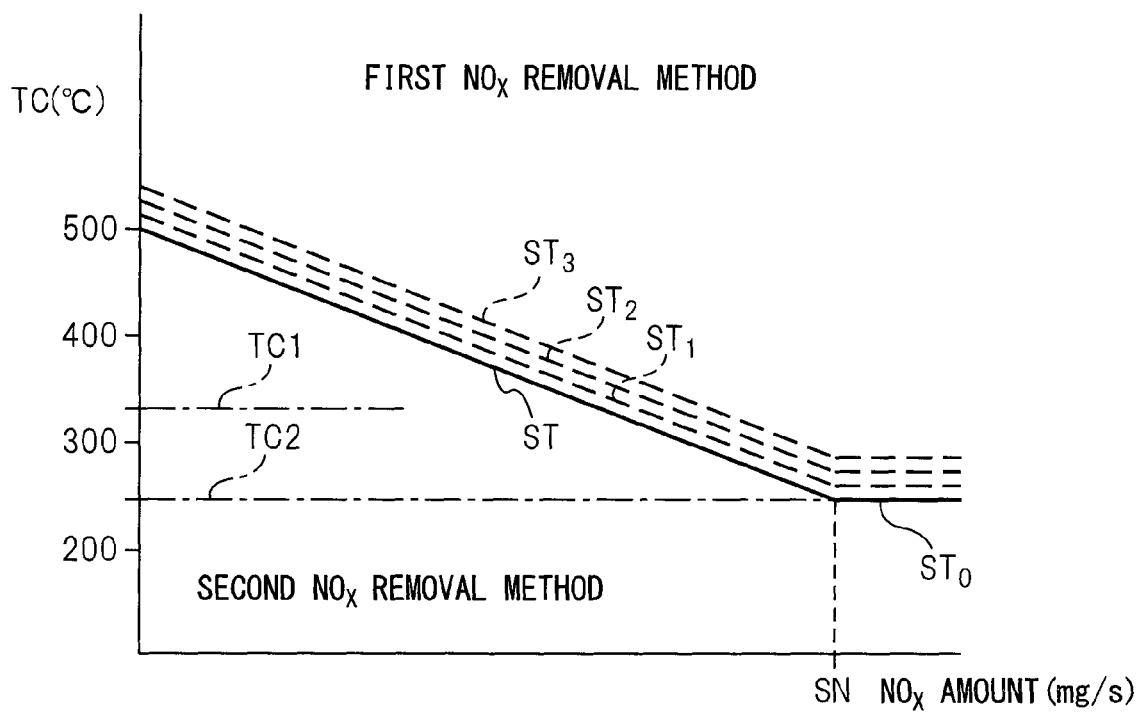

FIG. 18 is a view which shows a further embodiment of switching temperatures ST and $ST_0$.

Figure 19A:
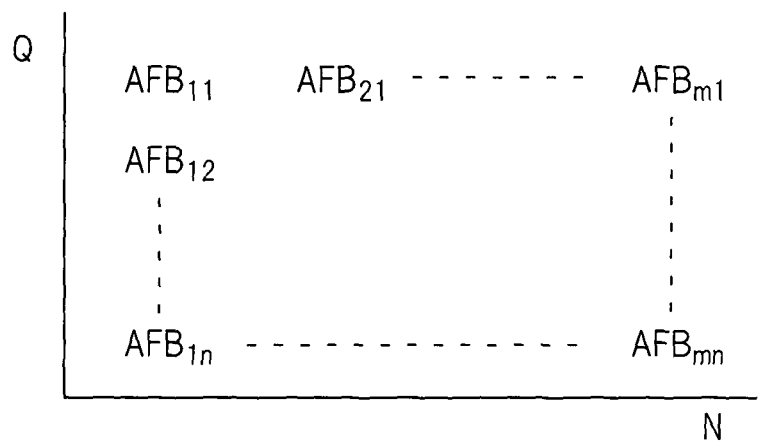
Figure 19B:
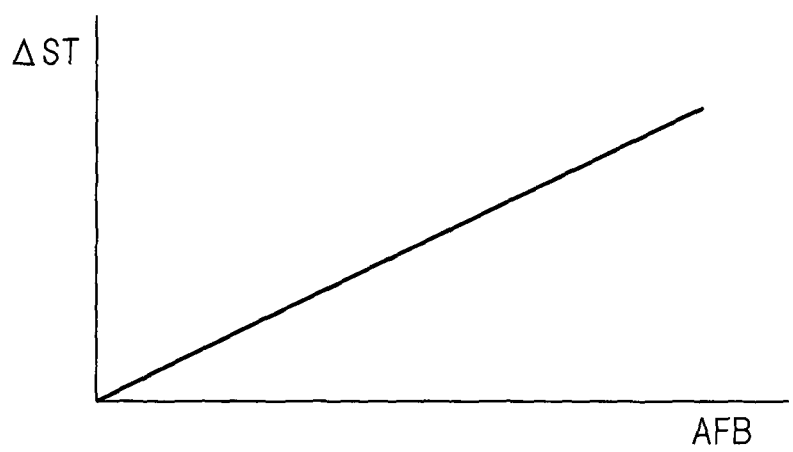

FIGS. 19A and 19B are views which show a map of a base air-fuel ratio, etc.

FIG. 20 is a view which shows a first $NO_x$ purification method and a second $NO_x$ purification method.

Figure 21:
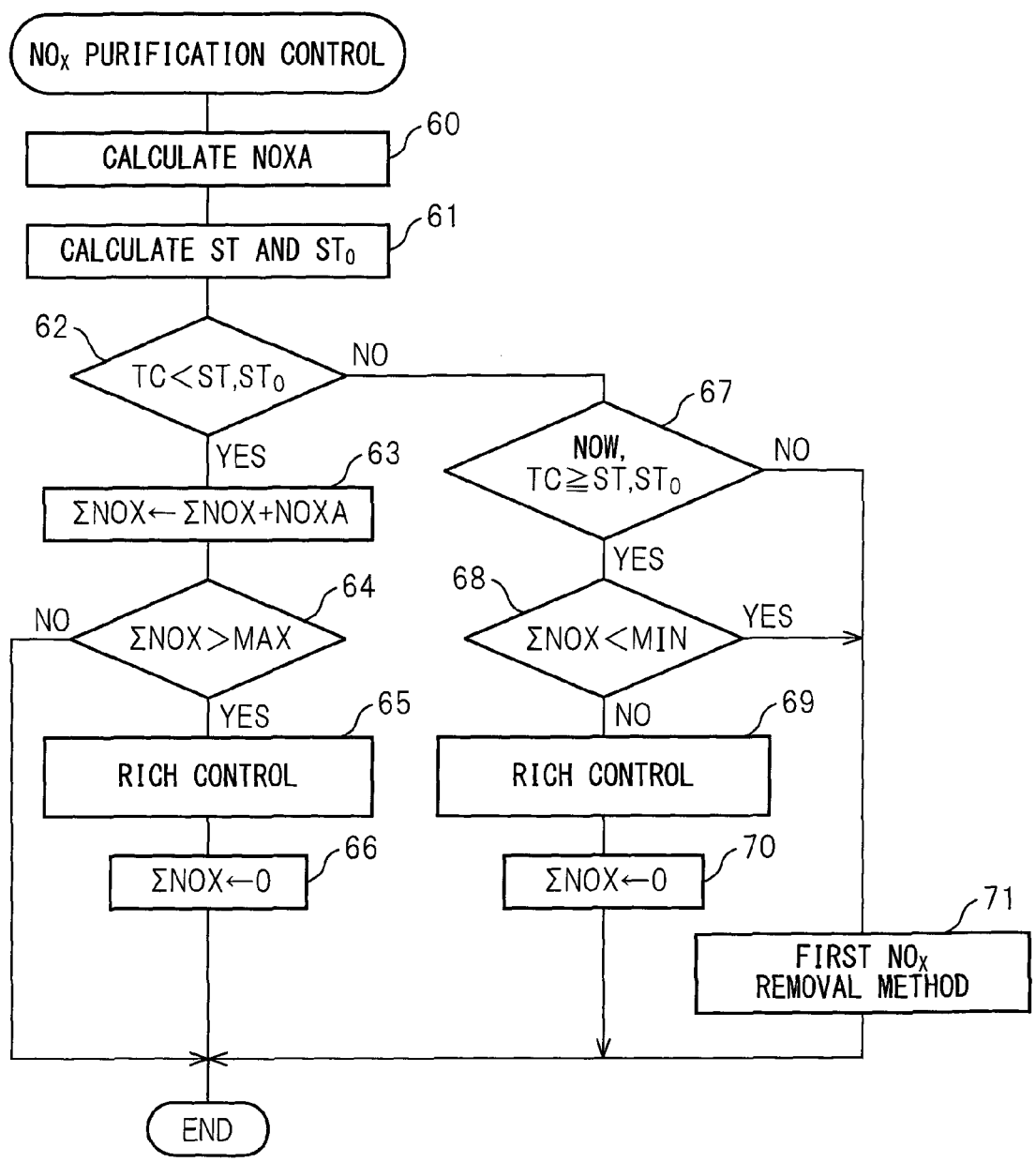

FIG. 21 is a flow chart for performing an $NO_x$ purification control.

Figure 22:
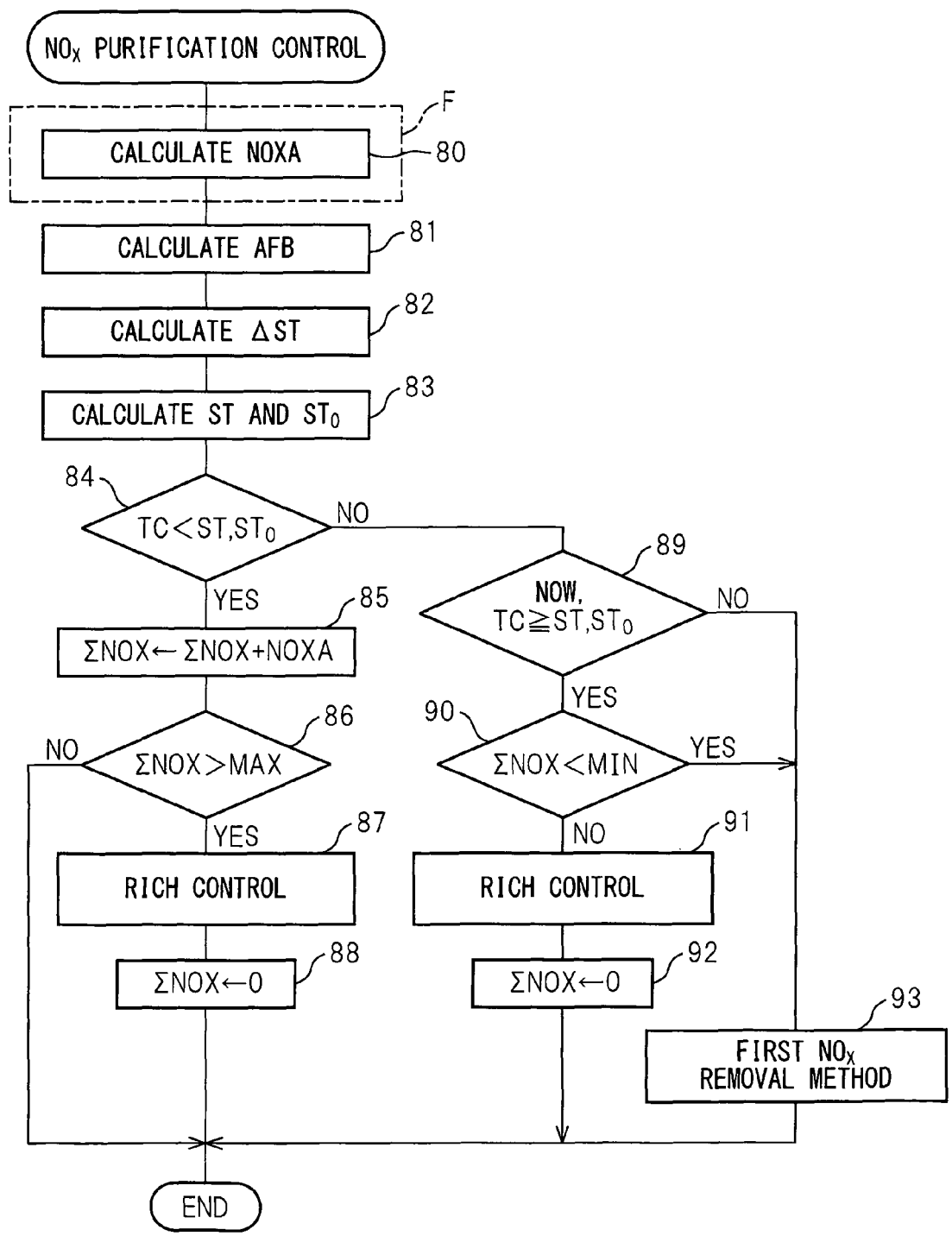

FIG. 22 is a flow chart for performing another embodiment of an $NO_x$ purification control.

Figure 23:
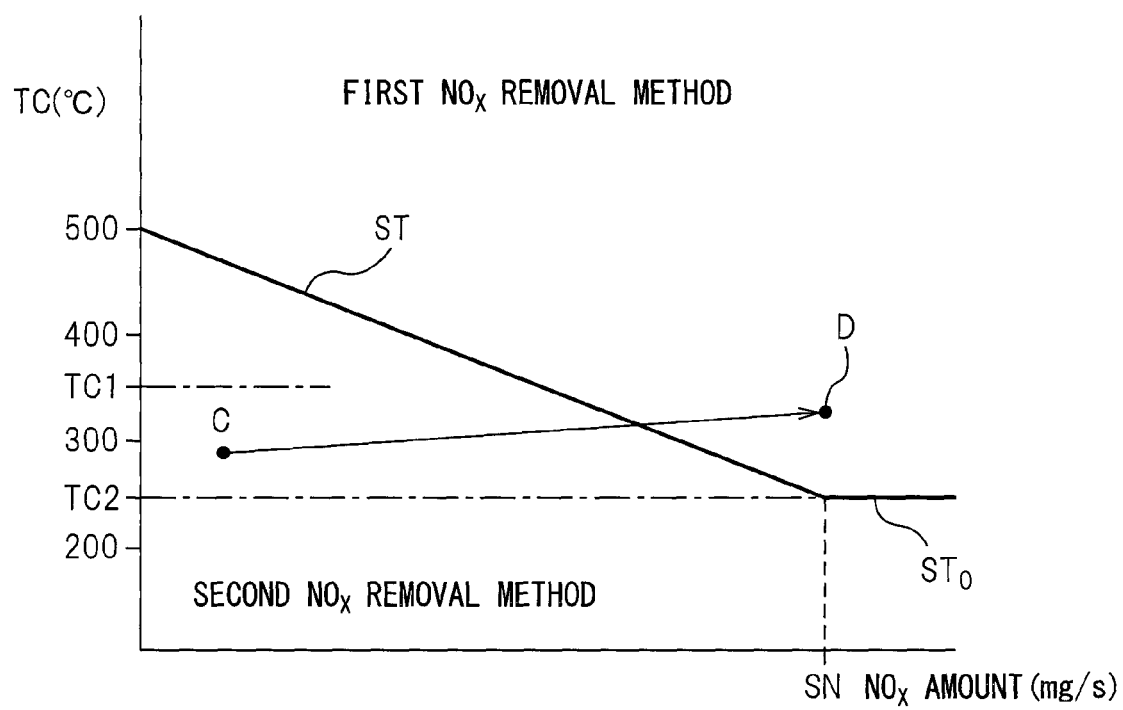

FIG. 23 is a view which shows a change in an $NO_x$ amount etc. at the time of an accelerating operation of a vehicle.

FIG. 24 is a time chart which shows a change in an amount of $NO_x$ flowing out from an exhaust purification catalyst, etc. at the time of an accelerating operation of a vehicle.

Figure 25A:
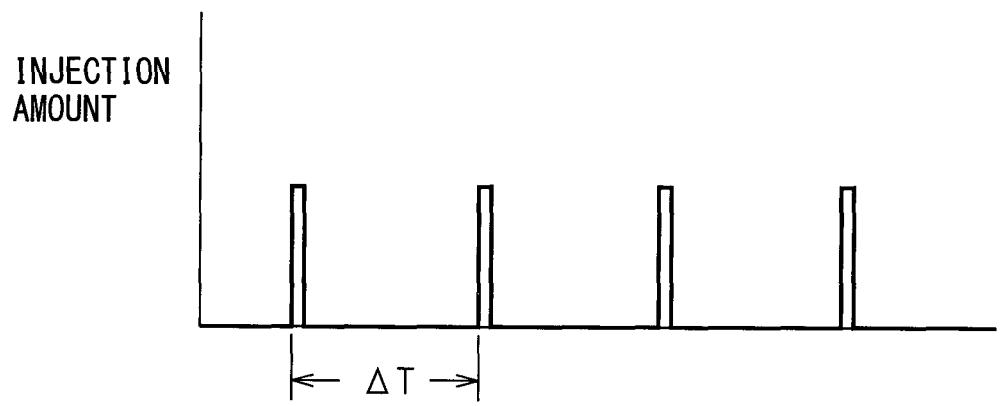
Figure 25B:
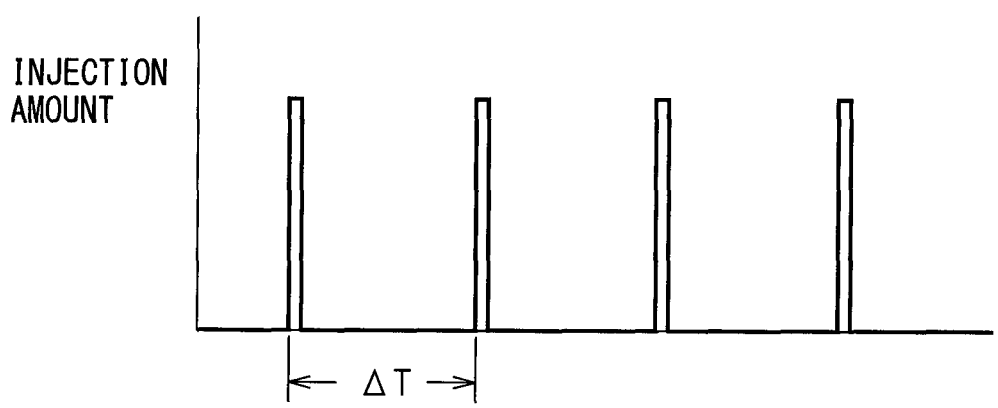
Figure 25C:
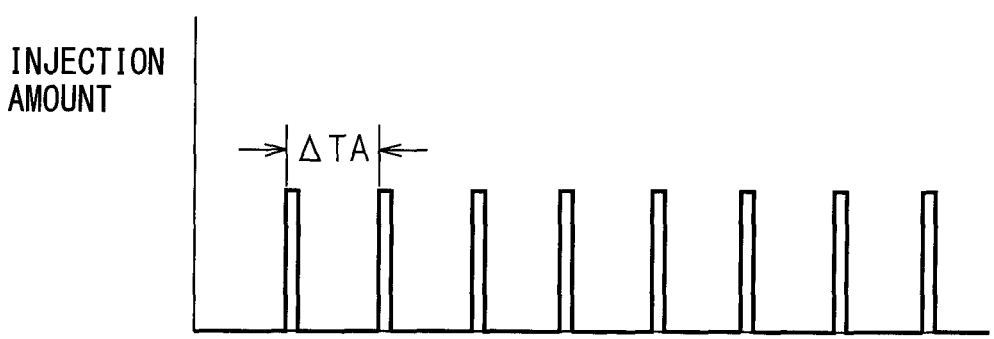

FIGS. 25A, 25B and 25C are views which show an injection amount and an injection period of hydrocarbons from a hydrocarbon feed valve.

Figure 26A:
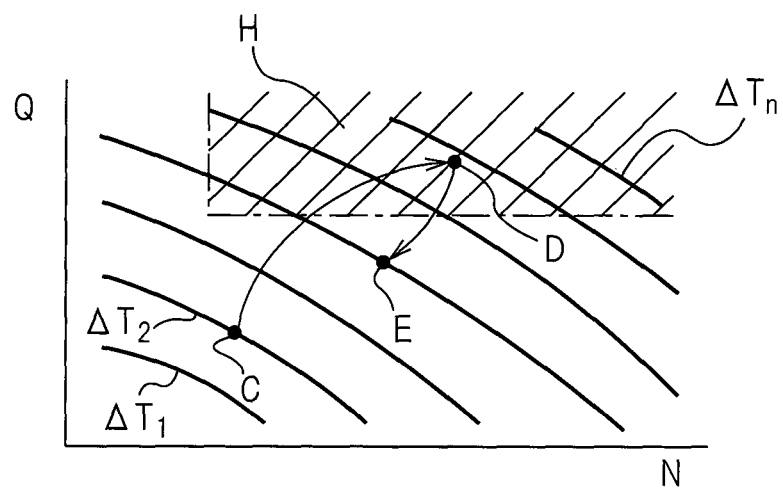
Figure 26B:
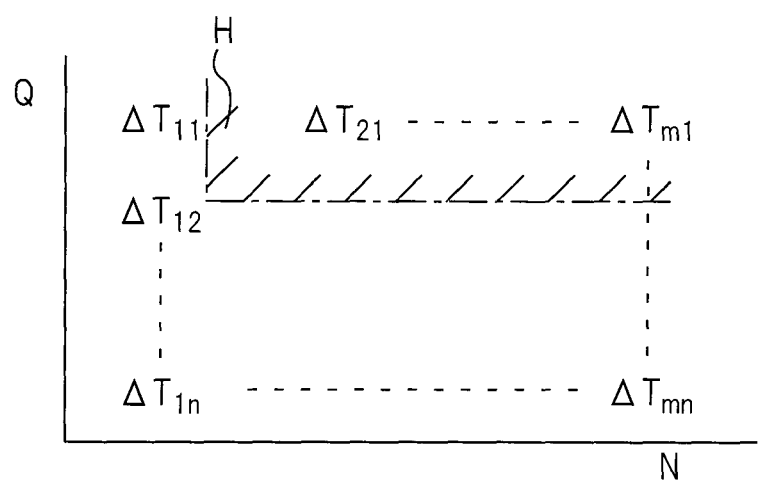

FIGS. 26A and 26B are views for explaining an injection period of hydrocarbons from a hydrocarbon feed valve at the time of an accelerating operation of a vehicle.

Figure 27:
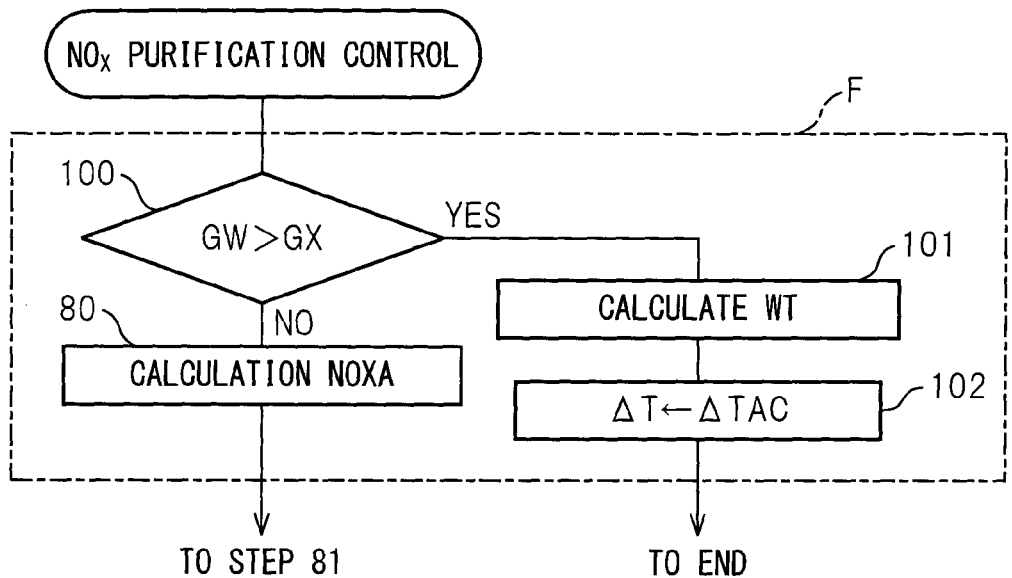

FIG. 27 is a flow chart for performing an $NO_x$ purification control, which shows another embodiment of a portion encircled by the dash and dotted line F in FIG.22.

Figure 28:
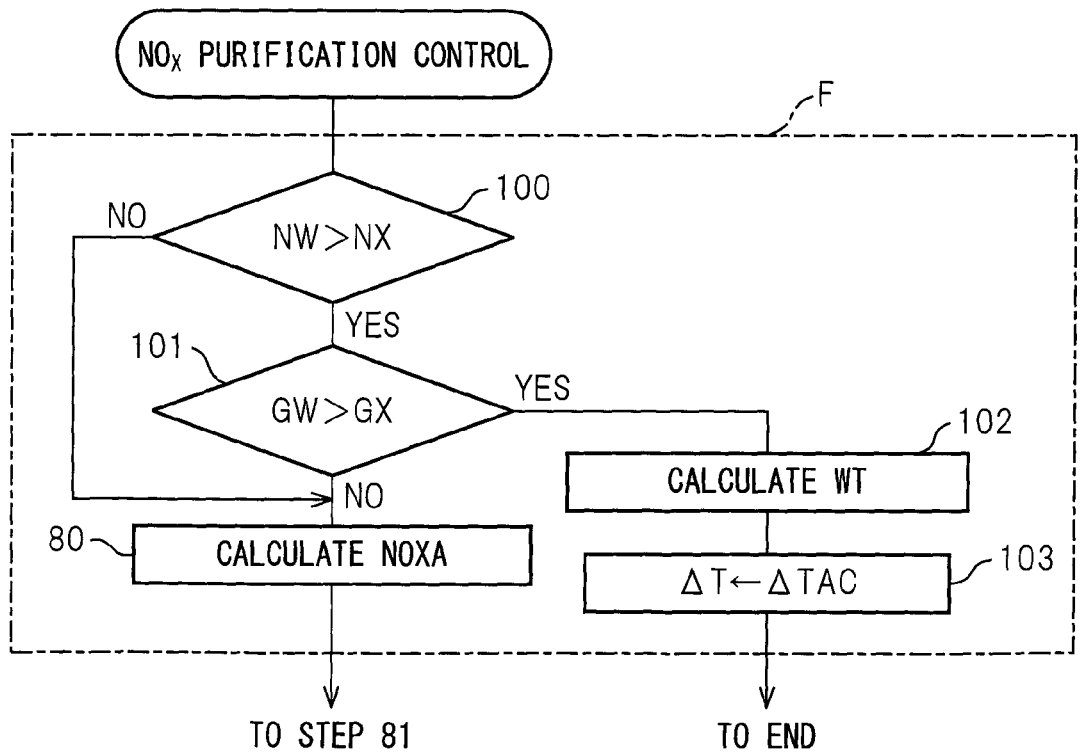

FIG. 28 is a flow chart for performing an $NO_x$ purification control, which shows a further embodiment of a portion encircled by the dash and dotted line F in FIG.22.

Figure 29:
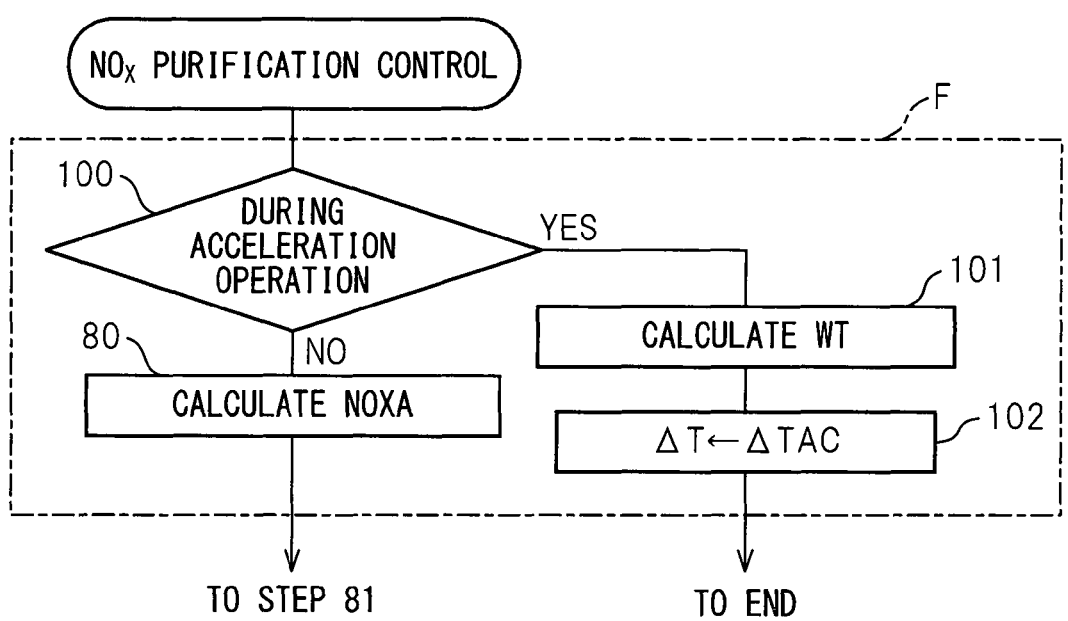

FIG. 29 is a flow chart for performing an $NO_x$ purification control, which shows a still further embodiment of a portion encircled by the dash and dotted line F in FIG.22.

DESCRIPTION OF EMBODIMENTS

Figure 1:
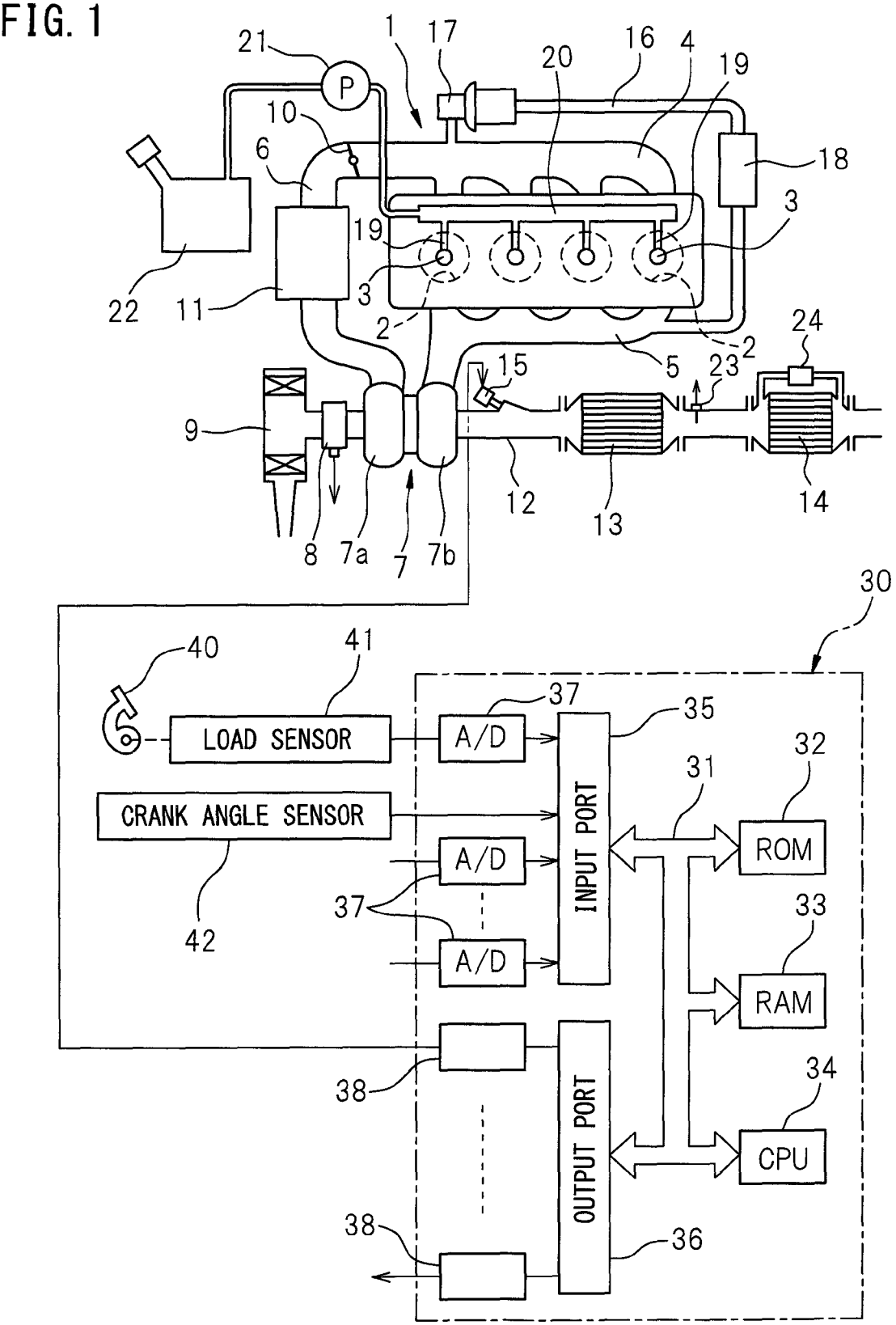
FIG. 1 is an overall view of a compression ignition type internal combustion engine.

FIG. 1 is an overall view of a compression ignition type internal combustion engine.

Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to an outlet of a compressor 7a of an exhaust turbocharger 7, while an inlet of the compressor 7a is connected through an intake air amount detector 8 to an air cleaner 9. Inside the intake duct 6, a throttle valve 10 which is driven by an actuator is arranged. Around the intake duct 6, a cooling device 11 is arranged for cooling the intake air which flows through the inside of the intake duct 6. In the embodiment which is shown in FIG. 1, the engine cooling water is guided to the inside of the cooling device 11 where the engine cooling water is used to cool the intake air.

On the other hand, the exhaust manifold 5 is connected to an inlet of an exhaust turbine 7b of the exhaust turbocharger 7, and an outlet of the exhaust turbine 7b is connected through an exhaust pipe 12 to an inlet of an exhaust purification catalyst 13. In an embodiment of the present invention, this exhaust purification catalyst 13 is comprised of an $NO_x$ storage catalyst 13. An outlet of the exhaust purification catalyst 13 is connected to a particulate filter 14 and, upstream of the exhaust purification catalyst 13 inside the exhaust pipe 12, a hydrocarbon feed valve 15 is arranged for feeding hydrocarbons comprised of diesel oil or other fuel used as fuel for a compression ignition type internal combustion engine. In the embodiment shown in FIG. 1, diesel oil is used as the hydrocarbons which are fed from the hydrocarbon feed valve 15. Note that, the present invention can also be applied to a spark ignition type internal combustion engine in which fuel is burned under a lean air-fuel ratio. In this case, from the hydrocarbon feed valve 15, hydrocarbons comprised of gasoline or other fuel used as fuel of a spark ignition type internal combustion engine are fed.

On the other hand, the exhaust manifold 5 and the intake manifold 4 are connected with each other through an exhaust gas recirculation (hereinafter referred to as an "EGR") passage 16. Inside the EGR passage 16, an electronically controlled EGR control valve 17 is arranged. Further, around the EGR passage 16, a cooling device 18 is arranged for cooling the EGR gas which flows through the inside of the EGR passage 16. In the embodiment which is shown in FIG. 1, the engine cooling water is guided to the inside of the cooling device 18 where the engine cooling water is used to cool the EGR gas. On the other hand, each fuel injector 3 is connected through a fuel feed tube 19 to a common rail 20. This common rail 20 is connected through an electronically controlled variable discharge fuel pump 21 to a fuel tank 22. The fuel which is stored inside of the fuel tank 22 is fed by the fuel pump 21 to the inside of the common rail 20. The fuel which is fed to the inside of the common rail 20 is fed through each fuel feed tube 19 to the fuel injector 3.

An electronic control unit 30 is comprised of a digital computer provided with a ROM (read only memory) 32, a RAM (random access memory) 33, a CPU (microprocessor) 34, an input port 35, and an output port 36, which are connected with each other by a bidirectional bus 31. Downstream of the exhaust purification catalyst 13, a temperature sensor 23 is arranged for detecting the temperature of the exhaust gas flowing out from the exhaust purification catalyst 13, and a pressure difference sensor 24 for detecting a pressure difference before and after the particulate filter 14 is attached to the particulate filter 14. The output signals of these temperature sensor 23, pressure difference sensor 24 and intake air amount detector 8 are input through respectively corresponding AD converters 37 to the input port 35. Further, an accelerator pedal 40 has a load sensor 41 connected to it which generates an output voltage proportional to the amount of depression L of the accelerator pedal 40. The output voltage of the load sensor 41 is input through a corresponding AD converter 37 to the input port 35. Furthermore, at the input port 35, a crank angle sensor 42 is connected which generates an output pulse every time a crankshaft rotates by, for example, 15°. On the other hand, the output port 36 is connected through corresponding drive circuits 38 to each fuel injector 3, the actuator for driving the throttle valve 10, hydrocarbon feed valve 15, EGR control valve 17, and fuel pump 21.

Figure 2:
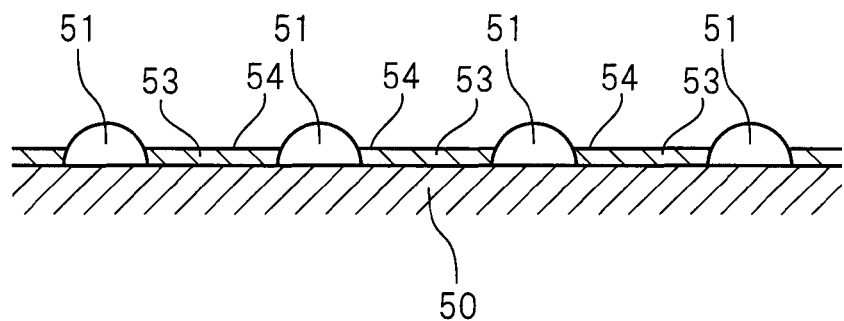
FIG. 2 is a view which schematically shows the surface part of a catalyst carrier.

FIG. 2 schematically shows a surface part of a catalyst carrier which is carried on a substrate of the exhaust purification catalyst 13 shown in FIG. 1. At this exhaust purification catalyst 13, as shown in FIG. 2, for example, there is provided a catalyst carrier 50 made of alumina on which precious metal catalysts 51 comprised of platinum Pt are carried. Furthermore, on this catalyst carrier 50, a basic layer 53 is formed which includes at least one element selected from potassium K, sodium Na, cesium Cs, or another such alkali metal, barium Ba, calcium Ca, or another such alkali earth metal, a lanthanide or another such rare earth and silver Ag, copper Cu, iron Fe, iridium Ir, or another metal able to donate electrons to $NO_x$. In this case, on the catalyst carrier 50 of the exhaust purification catalyst 13, in addition to platinum Pt, rhodium Rh or palladium Pd may be further carried. Note that the exhaust gas flows along the top of the catalyst carrier 50, so the precious metal catalysts 51 can be said to be carried on the exhaust gas flow surfaces of the exhaust purification catalyst 13. Further, the surface of the basic layer 53 exhibits basicity, so the surface of the basic layer 53 is called the "basic exhaust gas flow surface parts 54".

Figure 3:
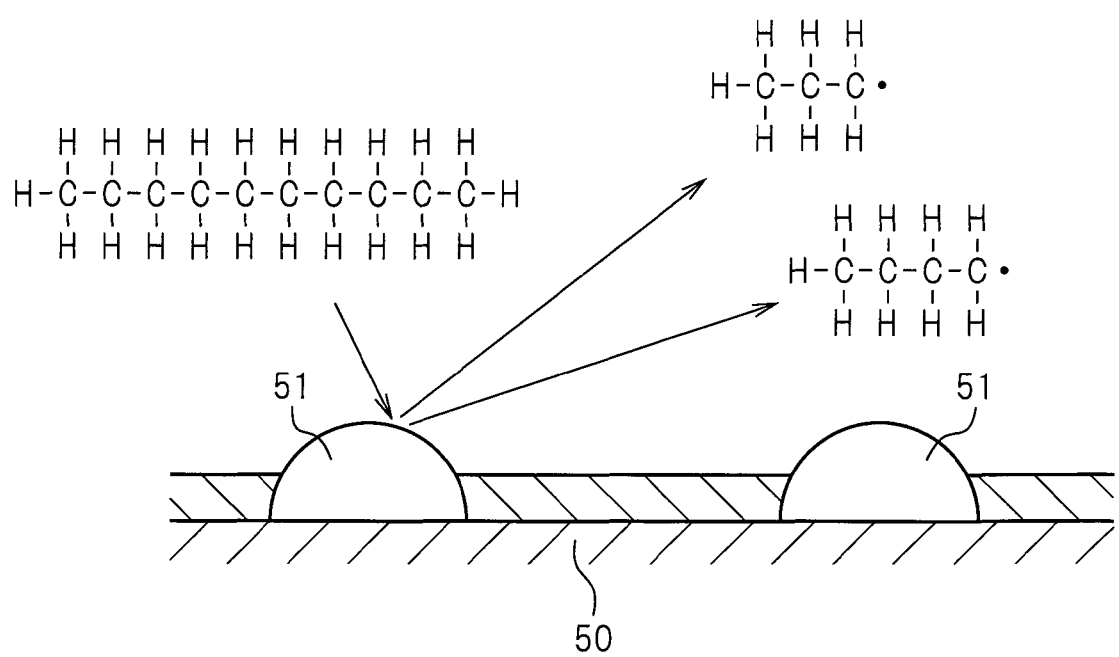
FIG. 3 is a view for explaining an oxidation reaction at an exhaust purification catalyst.

If hydrocarbons are injected from the hydrocarbon feed valve 15 into the exhaust gas, the hydrocarbons are reformed by the exhaust purification catalyst 13. In the present invention, at this time, the reformed hydrocarbons are used to remove the $NO_x$ at the exhaust purification catalyst 13. FIG. 3 schematically shows the reformation action performed at the exhaust purification catalyst 13 at this time. As shown in FIG. 3, the hydrocarbons HC which are injected from the hydrocarbon feed valve 15 become radical hydrocarbons HC with a small carbon number due to the precious metal catalyst 51.

Figure 4:
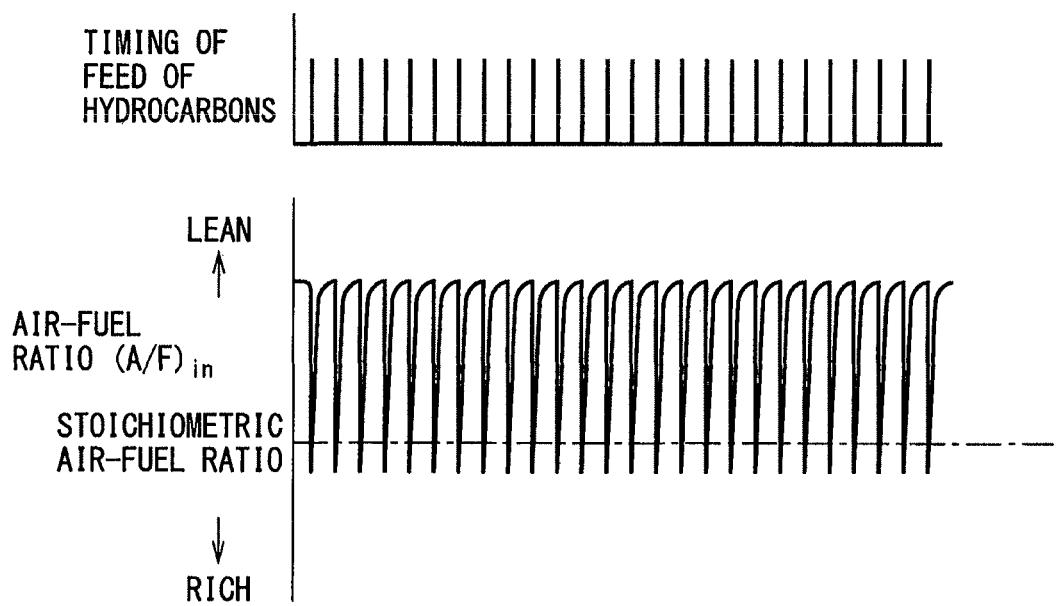
FIG. 4 is a view which shows changes in an air-fuel ratio of exhaust gas which flows into an exhaust purification catalyst.

FIG. 4 shows the feed timing of hydrocarbons from the hydrocarbon feed valve 15 and the change in the air-fuel ratio (A/F)in of the exhaust gas which flows into the exhaust purification catalyst 13. Note that, the change in the air-fuel ratio (A/F)in depends on the change in concentration of the hydrocarbons in the exhaust gas which flows into the exhaust purification catalyst 13, so it can be said that the change in the air-fuel ratio (A/F)in shown in FIG. 4 expresses the change in concentration of the hydrocarbons. However, if the hydrocarbon concentration becomes higher, the air-fuel ratio (A/F)in becomes smaller, so, in FIG. 4, the more to the rich side the air-fuel ratio (A/F)in becomes, the higher the hydrocarbon concentration.

Figure 5:
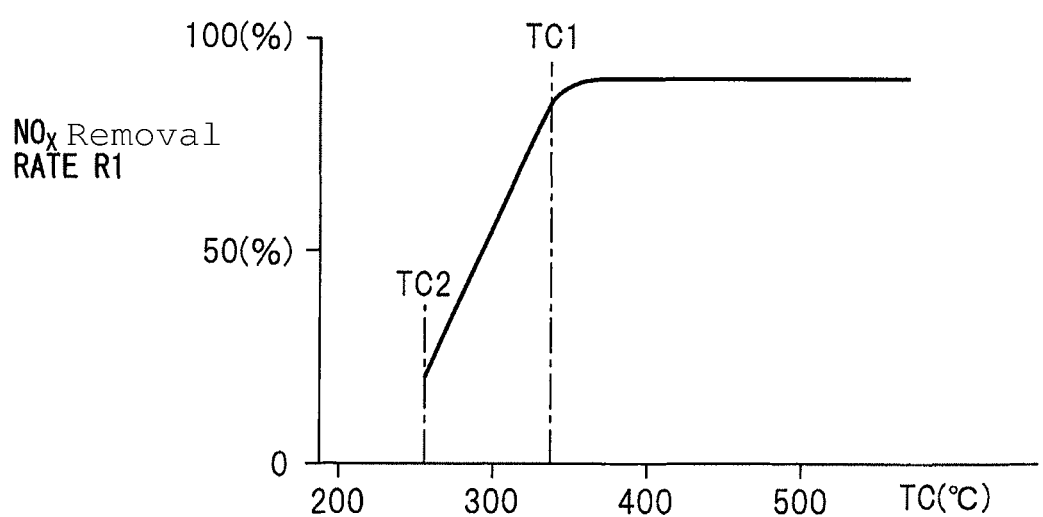
FIG. 5 is a view which shows an $NO_x$ removal rate R1.

FIG. 5 shows the $NO_x$ removal rate R1 by the exhaust purification catalyst 13 with respect to the catalyst temperatures TC of the exhaust purification catalyst 13 when periodically making the concentration of hydrocarbons which flow into the exhaust purification catalyst 13 change so as to, as shown in FIG. 4, periodically make the air-fuel ratio (A/F)in of the exhaust gas flowing to the exhaust purification catalyst 13 rich. In this regard, as a result of a research relating to $NO_x$ purification for a long time, it is learned that if making the concentration of hydrocarbons which flow into the exhaust purification catalyst 13 vibrate by within a predetermined range of amplitude and within a predetermined range of period, as shown in FIG. 5, an extremely high $NO_x$ removal rate R1 is obtained even in a 350° C. or higher high temperature region.

Figure 6A:
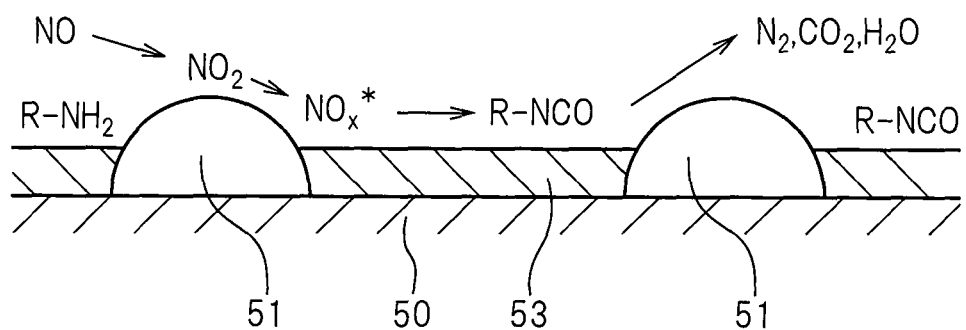
FIGS. 6A and 6B are views for explaining an oxidation reduction reaction in an exhaust purification catalyst.
Figure 6B:
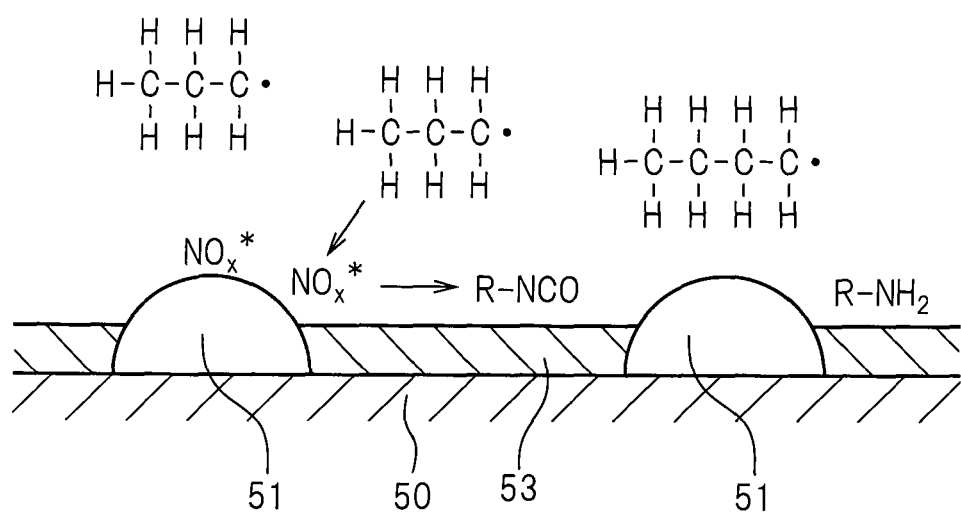

Furthermore, it is learned that at this time, a large amount of reducing intermediates which contain nitrogen and hydrocarbons continues to be held or adsorbed on the surface of the basic layer 53, that is, on the basic exhaust gas flow surface parts 54 of the exhaust purification catalyst 13, and the reducing intermediates play a central role in obtaining a high $NO_x$ removal rate R1. Next, this will be explained with reference to FIGS. 6A and 6B. Note that, these FIGS. 6A and 6B schematically show the surface part of the catalyst carrier 50 of the exhaust purification catalyst 13. These FIGS. 6A and 6B show the reaction which is presumed to occur when the concentration of hydrocarbons which flow into the exhaust purification catalyst 13 is made to vibrate by within a predetermined range of amplitude and within a predetermined range of period.

FIG. 6A shows when the concentration of hydrocarbons which flow into the exhaust purification catalyst 13 is low, while FIG. 6B shows when hydrocarbons are fed from the hydrocarbon feed valve 15 and the air-fuel ratio (A/F)in of the exhaust gas flowing to the exhaust purification catalyst 13 is made rich, that is, the concentration of hydrocarbons which flow into the exhaust purification catalyst 13 becomes higher.

Now, as will be understood from FIG. 4, the air-fuel ratio of the exhaust gas which flows into the exhaust purification catalyst 13 is maintained lean except for an instant, so the exhaust gas which flows into the exhaust purification catalyst 13 normally becomes a state of oxygen excess. At this time, part of the NO which is contained in the exhaust gas deposits on the exhaust purification catalyst 13, while part of the NO which is contained in the exhaust gas, as shown in FIG. 6A, is oxidized on the platinum 51 and becomes $NO_2$. Next, this $NO_2$ is further oxidized and becomes $NO_3$. Further, part of the $NO_2$ becomes $NO_2^-$. Therefore, on the platinum Pt 51, $NO_2^-$ and $NO_3$ are produced. The NO which is deposited on the exhaust purification catalyst 13 and the $NO_2^-$ and $NO_3$ which are formed on the platinum Pt 51 are strong in activity. Therefore, below, these NO, $NO_2^-$, and $NO_3$ will be referred to as the "active $NO_x^*$".

On the other hand, if hydrocarbons are fed from the hydrocarbon feed valve 15 and the air-fuel ratio (A/F)in of the exhaust gas flowing to the exhaust purification catalyst 13 is made rich, the hydrocarbons successively deposit over the entire exhaust purification catalyst 13. The majority of the deposited hydrocarbons successively react with oxygen and are burned. Part of the deposited hydrocarbons are successively reformed and become radicalized inside of the exhaust purification catalyst 13 as shown in FIG. 3. Therefore, as shown in FIG. 6B, the hydrogen concentration around the active $NO_x^*$ becomes higher. In this regard, if, after the active $NO_x^*$ is produced, the state of a high oxygen concentration around the active $NO_x^*$ continues for a constant time or more, the active $NO_x^*$ is oxidized and is absorbed in the form of nitrate ions $NO_3^-$ inside the basic layer 53. However, if, before this constant time elapses, the hydrocarbon concentration around the active $NO_x^*$ becomes higher, as shown in FIG. 6B, the active $NO_x^*$ reacts on the platinum 51 with the radical hydrocarbons HC to thereby form the reducing intermediates. The reducing intermediates are adhered or adsorbed on the surface of the basic layer 53.

Note that, at this time, the first produced reducing intermediate is considered to be a nitro compound R—$NO_2$. If this nitro compound R—$NO_2$ is produced, the result becomes a nitrile compound R—CN, but this nitrile compound R—CN can only survive for an instant in this state, so immediately becomes an isocyanate compound R—NCO. This isocyanate compound R—NCO becomes an amine compound R—$NH_2$ if hydrolyzed. However, in this case, what is hydrolyzed is considered to be part of the isocyanate compound R—NCO. Therefore, as shown in FIG. 6B, the majority of the reducing intermediates which are held or adsorbed on the surface of the basic layer 53 is believed to be the isocyanate compound R—NCO and amine compound R—$NH_2$.

On the other hand, as shown in FIG. 6B, if the produced reducing intermediates are surrounded by the hydrocarbons HC, the reducing intermediates are blocked by the hydrocarbons HC and the reaction will not proceed any further. In this case, if the concentration of hydrocarbons which flow into the exhaust purification catalyst 13 is lowered and then the hydrocarbons which are deposited around the reducing intermediates will be oxidized and consumed, and thereby the concentration of oxygen around the reducing intermediates becomes higher, the reducing intermediates react with the $NO_x$ in the exhaust gas, react with the active $NO_x^*$, react with the surrounding oxygen, or break down on their own. Due to this, the reducing intermediates R—NCO and R—$NH_2$ are converted to $N_2$, $CO_2$, and $H_2O$ as shown in FIG. 6A, therefore the $NO_x$ is removed.

In this way, in the exhaust purification catalyst 13, when the concentration of hydrocarbons which flow into the exhaust purification catalyst 13 is made higher, reducing intermediates are produced, and after the concentration of hydrocarbons which flow into the exhaust purification catalyst 13 is lowered, when the oxygen concentration is raised, the reducing intermediates react with the $NO_x$ in the exhaust gas or the active $NO_x^*$ or oxygen or break down on their own whereby the $NO_x$ is removed. That is, in order for the exhaust purification catalyst 13 to remove the $NO_x$, the concentration of hydrocarbons which flow into the exhaust purification catalyst 13 has to be periodically changed.

Of course, in this case, it is necessary to raise the hydrocarbon concentration to a concentration sufficiently high for producing the reducing intermediates and it is necessary to lower the hydrocarbon concentration to a concentration sufficiently low for making the produced reducing intermediates react with the $NO_x$ in the exhaust gas or the active $NO_x^*$ or oxygen or break down on their own. That is, it is necessary to make the concentration of hydrocarbons which flow into the exhaust purification catalyst 13 vibrate by within a predetermined range of amplitude. Note that, in this case, it is necessary to hold these reducing intermediates on the basic layer 53, that is, the basic exhaust gas flow surface parts 54, until the produced reducing intermediates R—NCO and R—$NH_2$ react with the $NO_x$ in the exhaust gas or the active $NO_x^*$ or oxygen or break down themselves. For this reason, the basic exhaust gas flow surface parts 54 are provided.

On the other hand, if lengthening the feed period of the hydrocarbons, the time until the oxygen concentration becomes higher becomes longer in the period after the hydrocarbons are fed until the hydrocarbons are next fed. Therefore, the active $NO_x^*$ is absorbed in the basic layer 53 in the form of nitrates without producing reducing intermediates. To avoid this, it is necessary to make the concentration of hydrocarbons which flow into the exhaust purification catalyst 13 vibrate by within a predetermined range of period.

Therefore, in the embodiment according to the present invention, to react the $NO_x$ contained in the exhaust gas and the reformed hydrocarbons and produce the reducing intermediates R—NCO and R—$NH_2$ containing nitrogen and hydrocarbons, the precious metal catalysts 51 are carried on the exhaust gas flow surfaces of the exhaust purification catalyst 13. To hold the produced reducing intermediates R—NCO and R—$NH_2$ inside the exhaust purification catalyst 13, the basic layers 53 are formed around the precious metal catalysts 51. The reducing intermediates R—NCO and R—$NH_2$ which are held on the basic layer 53 are converted to $N_2$, $CO_2$, and $H_2O$. The vibration period of the hydrocarbon concentration is made the vibration period required for continuation of the production of the reducing intermediates R—NCO and R—$NH_2$. Incidentally, in the example shown in FIG. 4, the injection interval is made 3 seconds.

Figure 7A:
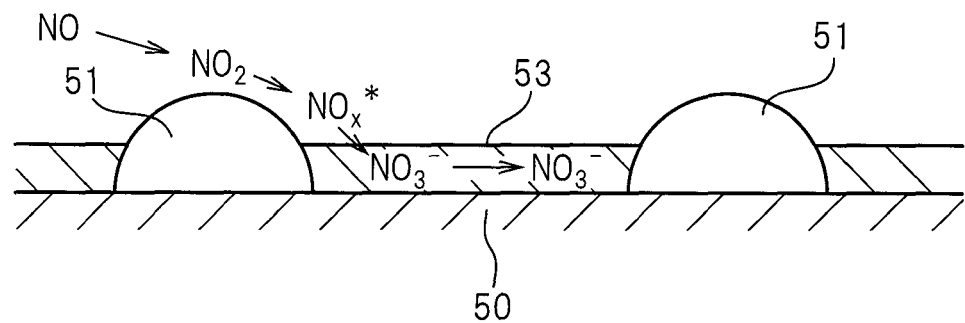

If the vibration period of the hydrocarbon concentration, that is, the injection period of hydrocarbons from the hydrocarbon feed valve 15, is made longer than the above predetermined range of period, the reducing intermediates R—NCO and R—$NH_2$ disappear from the surface of the basic layer 53. At this time, the active $NO_x^*$ which is produced on the platinum Pt 53, as shown in FIG. 7A, diffuses in the basic layer 53 in the form of nitrate ions $NO_3^-$ and becomes nitrates. That is, at this time, the $NO_x$ in the exhaust gas is absorbed in the form of nitrates inside of the basic layer 53.

Figure 7B:
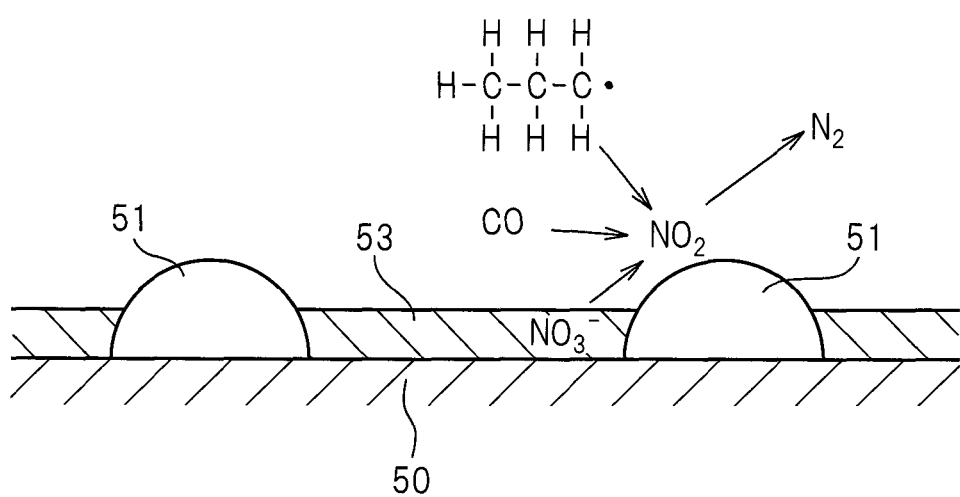

On the other hand, FIG. 7B shows the case where the air-fuel ratio of the exhaust gas which flows into the exhaust purification catalyst 13 is made rich when the $NO_x$ is absorbed in the form of nitrates inside of the basic layer 53. In this case, the oxygen concentration in the exhaust gas falls, so the reaction proceeds in the opposite direction ($NO_3^- \rightarrow NO_2$), and consequently the nitrates absorbed in the basic layer 53 successively become nitrate ions $NO_3^-$ and, as shown in FIG. 7B, are released from the basic layer 53 in the form of $NO_2$. Next, the released $NO_2$ is reduced by the hydrocarbons HC and CO contained in the exhaust gas.

FIG. 8 shows the case of making the air-fuel ratio (A/F)in of the exhaust gas which flows into the exhaust purification catalyst 13 temporarily rich slightly before the $NO_x$ absorption ability of the basic layer 53 becomes saturated. Note that, in the example shown in FIG. 8, the time interval of this rich control is 1 minute or more. In this case, the $NO_x$ which was absorbed in the basic layer 53 when the air-fuel ratio (A/F)in of the exhaust gas was lean is released all at once from the basic layer 53 and reduced when the air-fuel ratio (A/F)in of the exhaust gas is made temporarily rich. Therefore, in this case, the basic layer 53 plays the role of an absorbent for temporarily absorbing $NO_x$.

Note that, at this time, sometimes the basic layer 53 temporarily adsorbs the $NO_x$. Therefore, if using term of "storage" as a term including both "absorption" and "adsorption", at this time, the basic layer 53 performs the role of an $NO_x$ storage agent for temporarily storing the $NO_x$.

That is, in this case, if the ratio of the air and fuel (hydrocarbons) which are supplied into the engine intake passage, combustion chambers 2, and upstream of the exhaust purification catalyst 13 in the exhaust passage is referred to as "the air-fuel ratio of the exhaust gas", the exhaust purification catalyst 13 functions as an $NO_x$ storage catalyst which stores the $NO_x$ when the air-fuel ratio of the exhaust gas is lean and releases the stored $NO_x$ when the oxygen concentration in the exhaust gas falls.

The solid line of FIG. 9 shows the $NO_x$ removal rate R2 when making the exhaust purification catalyst 13 function as an $NO_x$ storage catalyst in this way. Note that, the abscissa of the FIG. 9 shows the catalyst temperature TC of the exhaust purification catalyst 13. When making the exhaust purification catalyst 13 function as an $NO_x$ storage catalyst, as shown in FIG. 9, when the catalyst temperature TC is 250° C. to 300° C., an extremely high $NO_x$ removal rate is obtained, but when the catalyst temperature TC becomes a 350° C. or higher high temperature, the $NO_x$ removal rate R2 falls.

In this way, when the catalyst temperature TC becomes 350° C. or more, the $NO_x$ removal rate R2 falls because if the catalyst temperature TC becomes 350° C. or more, $NO_x$ is less easily stored and the nitrates break down by heat and are released in the form of $NO_2$ from the exhaust purification catalyst 13. That is, so long as storing $NO_x$ in the form of nitrates, when the catalyst temperature TC is high, it is difficult to obtain a high $NO_x$ removal rate R2. However, in the new $NO_x$ purification method shown from FIG. 4 to FIGS. 6A and 6B, the amount of $NO_x$ stored in the form of nitrates is small, and consequently, as shown in FIG. 5, even when the catalyst temperature TC is high, a high $NO_x$ removal rate R1 is obtained.

In the embodiment according to the present invention, to be able to purify $NO_x$ by using this new $NO_x$ purification method, a hydrocarbon feed valve 15 for feeding hydrocarbons is arranged in the engine exhaust passage, an exhaust purification catalyst 13 is arranged in the engine exhaust passage downstream of the hydrocarbon feed valve 15, precious metal catalysts 51 are carried on the exhaust gas flow surfaces of the exhaust purification catalyst 13, the basic layers 53 are formed around the precious metal catalysts 51, the exhaust purification catalyst 13 has the property of reducing the $NO_x$ contained in exhaust gas by the reducing intermediates which are held on the basic layers 53 if hydrocarbons are injected from the hydrocarbon feed valve 15 within a predetermined range of period and has the property of being increased in storage amount of $NO_x$ contained in exhaust gas if making the injection period of the hydrocarbon from the hydrocarbon feed valve 15 longer than this predetermined range, and, at the time of engine operation, the hydrocarbons are injected from the hydrocarbon feed valve 15 within the predetermined range of period to thereby reduce the $NO_x$ which is contained in the exhaust gas in the exhaust purification catalyst 13.

That is, the $NO_x$ purification method which is shown from FIG. 4 to FIGS. 6A and 6B can be said to be a new $NO_x$ purification method designed to remove $NO_x$ without forming so much nitrates in the case of using an exhaust purification catalyst which carries precious metal catalysts and forms a basic layer which can absorb $NO_x$. In actuality, when using this new $NO_x$ purification method, the nitrates which are detected from the basic layer 53 are smaller in amount compared with the case where making the exhaust purification catalyst 13 function as an $NO_x$ storage catalyst. Note that, this new $NO_x$ purification method will be referred to below as the "first $NO_x$ removal method".

Now, as mentioned before, if the injection period $\Delta T$ of the hydrocarbons from the hydrocarbon feed valve 15 becomes longer, the time period in which the oxygen concentration around the active $NO_x^*$ becomes higher becomes longer in the time period after the hydrocarbons are injected to when the hydrocarbons are next injected. In this case, in the embodiment shown in FIG. 1, if the injection period $\Delta T$ of the hydrocarbons becomes longer than about 5 seconds, the active $NO_x^*$ starts to be absorbed in the form of nitrates inside the basic layer 53. Therefore, as shown in FIG. 10, if the vibration period $\Delta T$ of the hydrocarbon concentration becomes longer than about 5 seconds, the $NO_x$ removal rate R1 falls. Therefore, the injection period $\Delta T$ of the hydrocarbons has to be made 5 seconds or less.

On the other hand, in the embodiment of the present invention, if the injection period $\Delta T$ of the hydrocarbons becomes about 0.3 second or less, the injected hydrocarbons start to build up on the exhaust gas flow surfaces of the exhaust purification catalyst 13, therefore, as shown in FIG. 10, if the injection period $\Delta T$ of the hydrocarbons becomes about 0.3 second or less, the $NO_x$ removal rate R1 falls. Therefore, in the embodiment according to the present invention, the injection period of the hydrocarbons is made from 0.3 second to 5 seconds.

Further, in the first $NO_x$ removal method according to the present invention, the $NO_x$ contained in the exhaust gas is reduced by the reducing intermediate which is held on the basic layer 53. Therefore, when the amount of the $NO_x$ contained in the exhaust gas increases, it is necessary to increase the amount of the reducing intermediate which is generated. To increase the amount of reducing intermediate which is generated, it is necessary to increase the amount of hydrocarbons which is fed per unit time from the hydrocarbon feed valve 15. To this end, it is necessary to increase the amount of injection of hydrocarbons from the hydrocarbon feed valve 15 or shorten the injection period $\Delta T$ of the hydrocarbons from the hydrocarbon feed valve 15. In this case, if excessively increasing the amount of injection of hydrocarbons from the hydrocarbon feed valve 15, the amount of hydrocarbons which slips through the exhaust purification catalyst 13 ends up increasing, so even if increasing the amount of injection of hydrocarbons from the hydrocarbon feed valve 15, there is a limit. Therefore, the amount of injection of hydrocarbons from the hydrocarbon feed valve 15 cannot be made to change that greatly. Therefore, in an embodiment according to the present invention, as shown in FIG. 10B, the more the amount (mg/s) of the $NO_x$ contained in the exhaust gas increases, the shorter the injection period $\Delta T$ of the hydrocarbons from the hydrocarbon feed valve 15 is made and thereby the more the amount of hydrocarbons which is fed per unit time is increased.

In an embodiment according to the present invention, the optimum injection amount and injection period of hydrocarbons from the hydrocarbon feed valve 15 for securing a good $NO_x$ removal action by the first $NO_x$ removal method are found in advance. In this case, in an embodiment according to the present invention, the optimum injection amount WT of hydrocarbons when performing the $NO_x$ removal action by the first $NO_x$ removal method is stored as a function of the amount Q of injection from the fuel injector 3 and the engine speed N in the form of a map such as shown in FIG. 11A in advance in the ROM 32. Further, the optimum injection period $\Delta T$ of the hydrocarbons at this time is also stored as a function of the amount Q of injection from the fuel injector 3 and engine speed N in the form of a map such as shown in FIG. 11B in advance in the ROM 32.

FIG. 11C schematically shows the value of the injection period ΔT which is stored in the map of FIG. 11B. Note that, the curves in FIG. 11C indicate equivalent injection period lines, and in FIG. 11C, the injection period ΔT becomes shorter in the order of ΔT1, ΔT2, . . . ΔTn. In this regard, the amount (mg/s) of the $NO_x$ contained in the exhaust gas increases the more the amount Q of injection from the fuel injector 3 increases, that is, the more the engine load increases, and increases the higher the engine speed N. Therefore, as will be understood from FIG. 11C, the injection period ΔT is made shorter the more the amount Q of injection from the fuel injector 3 increases and is made shorter the higher the engine speed N.

Next, referring to FIG. 12 to FIG. 15, an $NO_x$ purification method when making the exhaust purification catalyst 13 function as an $NO_x$ storage catalyst will be explained specifically. The $NO_x$ purification method in the case of making the exhaust purification catalyst 13 function as an $NO_x$ storage catalyst in this way will be referred to below as the "second $NO_x$ removal method".

In this second $NO_x$ removal method, as shown in FIG. 12, when the stored $NO_x$ amount ΣNOX of $NO_x$ which is stored in the basic layer 53 exceeds a predetermined allowable amount MAX, the air-fuel ratio (A/F)in of the exhaust gas flowing into the exhaust purification catalyst 13 is temporarily made rich. If the air-fuel ratio (A/F)in of the exhaust gas is made rich, the $NO_x$ which was stored in the basic layer 53 when the air-fuel ratio (A/F)in of the exhaust gas was lean is released from the basic layer 53 all at once and reduced. Due to this, the $NO_x$ is removed.

The stored $NO_x$ amount ΣNOX is, for example, calculated from the amount of $NO_x$ which is exhausted from the engine. In this embodiment according to the present invention, the exhausted $NO_x$ amount NOXA of $NO_x$ which is exhausted from the engine per unit time is stored as a function of the injection amount Q and engine speed N in the form of a map such as shown in FIG. 13 in advance in the ROM 32. The stored $NO_x$ amount ΣNOX is calculated from this exhausted $NO_x$ amount NOXA. In this case, as explained before, the period at which the air-fuel ratio (A/F)in of the exhaust gas is made rich is usually 1 minute or more.

In this second $NO_x$ removal method, as shown in FIG. 14, by injecting an additional fuel WR into each combustion chamber 2 from the fuel injector 3 in addition to the combustion-use fuel Q, the air-fuel ratio (A/F)in of the exhaust gas which flows into the exhaust purification catalyst 13 is made rich. Note that, in FIG. 14, the abscissa indicates the crank angle. This additional fuel WR is injected at a timing at which it will burn, but will not appear as engine output, that is, slightly before ATDC90° after compression top dead center. This fuel amount WR is stored as a function of the injection amount Q and engine speed N in the form of a map such as shown in FIG. 15 in advance in the ROM 32. Of course, in this case, it is also possible to make the injection amount of hydrocarbons from the hydrocarbon feed valve 15 increase so as to make the air-fuel ratio (A/F)in of the exhaust gas rich.

Now then, as will be understood if comparing an $NO_x$ removal rate R1 by the first $NO_x$ removal method shown in FIG. 5 and an $NO_x$ removal rate R2 by the second $NO_x$ removal method shown in FIG. 9, when the catalyst temperature TC is relatively low, the $NO_x$ removal rate R2 by the second $NO_x$ removal method become higher, while if the catalyst temperature TC becomes high, the $NO_x$ removal rate R1 by the first $NO_x$ removal method becomes higher. Therefore, in an embodiment according to the present invention, generally speaking, when the catalyst temperature TC is low, the second $NO_x$ removal method is used, while if the catalyst temperature TC is high, the first $NO_x$ removal method is used.

In this regard, as explained above, when the first $NO_x$ removal method is being used, the $NO_x$ contained in the exhaust gas is reduced by the reducing intermediate which is held on the basic layer 53, and the amount of hydrocarbons which is required for generating this reducing intermediate is fed from the hydrocarbon feed valve 15. On the other hand, when the second $NO_x$ removal method is being used, the stored $NO_x$ is released from the exhaust purification catalyst 13 and reduced by making the air-fuel ratio of the exhaust gas flowing into the exhaust purification catalyst 13 rich. In this regard, to make the $NO_x$ which was once stored in the exhaust purification catalyst 13 be released from the exhaust purification catalyst 13 and be reduced in this way, a large amount of reducing agent becomes necessary.

Therefore, the amount of reducing agent which is required for releasing the stored $NO_x$ from the exhaust purification catalyst 13 and reduce it in the second $NO_x$ removal method, that is, the amount of fuel which is required for making the air-fuel ratio of the exhaust gas rich, is larger compared with the amount of hydrocarbons, that is, the amount of reducing agent, which is required for generating the reducing intermediate in the first $NO_x$ removal method. That is, the amount of reducing agent which is required for removing the $NO_x$ is greater in the case of using the second $NO_x$ removal method compared with the case of using the first $NO_x$ removal method. Therefore, it is preferable to use the first $NO_x$ removal method as much as possible.

In this regard, as explained above, in an embodiment according to the present invention, when the catalyst temperature TC is low, the second $NO_x$ removal method is used, while when the catalyst temperature TC is high, the first $NO_x$ removal method is used. Therefore, in an embodiment according to the present invention, if the catalyst temperature TC becomes high, an $NO_x$ removal method is switched from the second $NO_x$ removal method to the first $NO_x$ removal method. In this case, as explained above, it is preferable to use the first $NO_x$ removal method as much as possible, so the temperature of the exhaust purification catalyst when an $NO_x$ removal method is switched from the second $NO_x$ removal method to the first $NO_x$ removal method is preferably as low as possible. However, it was learned that the allowable lower limit temperature of the exhaust purification catalyst which gives a good $NO_x$ removal rate using the first $NO_x$ removal method is affected by the amount of $NO_x$ which is contained in the exhaust gas and that this allowable lower limit temperature becomes lower the more the amount of $NO_x$ which is contained in the exhaust gas increases. Next, this allowable lower limit temperature of the exhaust purification catalyst 13 will be explained while referring to FIG. 16.

In FIG. 16, the solid line ST shows the allowable lower limit temperature of the exhaust purification catalyst 13. Note that, in FIG. 16, the ordinate shows the temperature TC of the exhaust purification catalyst 13, while the abscissa shows the amount (mg/s) of $NO_x$ per unit time which is contained in the exhaust gas. That is, as explained above, in the first $NO_x$ removal method, the $NO_x$ contained in the exhaust gas is reduced by the reducing intermediate which is held on the basic layer 53. Therefore, when the amount of the $NO_x$ contained in the exhaust gas increases, it is necessary to increase the amount of the reducing intermediate which is generated. To increase the amount of reducing intermediate which is generated, it is necessary to increase the amount of hydrocarbons which is fed per unit time from the hydrocarbon feed valve 15. To this end, it is necessary to increase the amount of injection of hydrocarbons from the hydrocarbon feed valve 15 or shorten the injection period ΔT of the hydrocarbons from the hydrocarbon feed valve 15. Therefore, in an embodiment according to the present invention, as shown in FIG. 10B, the more the amount (mg/s) of the $NO_x$ which is contained in the exhaust gas increases, the shorter the injection period ΔT of the hydrocarbons from the hydrocarbon feed valve 15 is made. In other words, the more the amount of the $NO_x$ which is contained in the exhaust gas is decreased, the longer the injection period ΔT of the hydrocarbons from the hydrocarbon feed valve 15 is made.

In this regard, if the injection period ΔT of the hydrocarbons from the hydrocarbon feed valve 15 is made longer, as explained while referring to FIG. 10A, the danger of the $NO_x$ being stored in the basic layer 53 arises. On the other hand, as explained above, if the catalyst temperature TC becomes high, it becomes harder for $NO_x$ to be stored in the basic layer 53. Therefore, when the injection period ΔT of the hydrocarbons from the hydrocarbon feed valve 15 is made long, the danger of the $NO_x$ being stored in the basic layer is eliminated if the catalyst temperature TC is high. That is, when the amount of the $NO_x$ contained in the exhaust gas decreases and the injection period ΔT of the hydrocarbons from the hydrocarbon feed valve 15 is made long, the danger of the $NO_x$ being stored in the basic layer is eliminated if the catalyst temperature TC is high. Therefore, the allowable lower limit temperature ST of the exhaust purification catalyst 13 where there is no danger of the $NO_x$ being stored in the basic layer even if injecting hydrocarbons from the hydrocarbon feed valve 15 for performing the $NO_x$ removal action by the first $NO_x$ removal method, that is, the allowable lower limit temperature ST of the exhaust purification catalyst 13 where a good $NO_x$ removal rate is obtained even if injecting hydrocarbons from the hydrocarbon feed valve 15 for performing the $NO_x$ removal action by the first $NO_x$ removal method, as shown in FIG. 16, becomes higher the smaller the amount (mg/s) of the $NO_x$ which is contained in the exhaust gas.

In this case, if making the catalyst temperature TC at which an $NO_x$ removal method is switched from the second $NO_x$ removal method to the first $NO_x$ removal method this allowable lower limit temperature ST of the exhaust purification catalyst 13, it becomes possible to use the first $NO_x$ removal method at the highest frequency. Therefore, in an embodiment according to the present invention, this allowable lower limit temperature ST of the exhaust purification catalyst 13 is made the switching temperature from the second $NO_x$ removal method to the first $NO_x$ removal method. Therefore, in an embodiment according to the present invention, the switching temperature ST from the second $NO_x$ removal method to the first $NO_x$ removal method, as shown in FIG. 16, is made lower the greater the amount of $NO_x$ in the exhaust gas which flows into the exhaust purification catalyst 13.

On the other hand, the exhaust purification catalyst 13 has a catalyst-specific lower limit temperature at which the ability to generate reducing intermediate falls and therefore the $NO_x$ removal rate falls regardless of the amount of $NO_x$ in the exhaust gas flowing into the exhaust purification catalyst 13, and it can be said to be preferable to avoid use of the first $NO_x$ removal method if the temperature TC of the exhaust purification catalyst 13 becomes this catalyst-specific lower limit temperature or less. This catalyst-specific lower limit temperature which is present for the first $NO_x$ removal method, in other words, the lower limit temperature of the exhaust purification catalyst 13 at which the first $NO_x$ removal method is used, is shown as $ST_0$ in FIG. 16. This catalyst-specific lower limit temperature $ST_0$ becomes a constant temperature which is determined in accordance with the exhaust purification catalyst 13. As shown in FIG. 5, the exhaust purification catalyst 13 has a purification rate drop start temperature TC1 at which the $NO_x$ removal rate starts to drop when the temperature TC of the exhaust purification catalyst 13 drops in case where the first $NO_x$ removal method is being used. In the embodiment shown in FIG. 16, this removal rate drop start temperature TC1 is used as the catalyst-specific lower limit temperature $ST_0$. As shown in FIG. 16, in this embodiment, if the amount of $NO_x$ in the exhaust gas flowing into the exhaust purification catalyst 13 increases, at the $NO_x$ amount SN, the allowable lower limit temperature ST, that is, the switching temperature ST, matches the catalyst-specific lower limit temperature $ST_0$.

In this regard, the amount of the $NO_x$ in the exhaust gas flowing into the exhaust purification catalyst 13 changes according to the engine operating state. In the embodiment shown in FIG. 16, the amount of $NO_x$ in the exhaust gas which flows into the exhaust purification catalyst 13 changes according to the engine operating state in the range which is shown by the abscissa of FIG. 16. Therefore, in the embodiment shown in FIG. 16, when the amount of $NO_x$ in the exhaust gas flowing into the exhaust purification catalyst 13 increases, the range in which the switching temperature from the second $NO_x$ removal method to the first $NO_x$ removal method falls becomes within the range of change at a small amount side in the range of change of the amount of $NO_x$ in the exhaust gas flowing into the exhaust purification catalyst 13 which amount changes in accordance with the engine operating state. That is, in the embodiment shown in FIG. 16, the switching temperature ST is made lower if the amount of $NO_x$ in the exhaust gas flowing into the exhaust purification catalyst 13 increases when the amount of $NO_x$ in the exhaust gas flowing into the exhaust purification catalyst 13 is smaller than the $NO_x$ amount SN which corresponds to the boundary between the allowable lower limit temperature ST and the catalyst-specific lower limit temperature $ST_0$, that is, when the amount of $NO_x$ in the exhaust gas flowing into the exhaust purification catalyst 13 is in the range of change at a small amount side within the range of change of the amount of $NO_x$ in the exhaust gas flowing into the exhaust purification catalyst 13.

Note that, in the embodiment shown in FIG. 16, the catalyst-specific lower limit temperature $ST_0$ also expresses the switching temperature ST at which an $NO_x$ removal method is switched from the second $NO_x$ removal method to the first $NO_x$ removal method. Therefore, in the embodiment shown in FIG. 16, the switching temperature ST falls if the amount of $NO_x$ in the exhaust gas flowing into the exhaust purification catalyst 13 increases when the amount of $NO_x$ in the exhaust gas flowing into the exhaust purification catalyst 13 is in the range of change at a small amount side within the range of change of the amount of $NO_x$ in the exhaust gas flowing into the exhaust purification catalyst 13, and the switching temperature ST is maintained at the catalyst-specific lower limit temperature $ST_0$ if the amount of $NO_x$ in the exhaust gas flowing into the exhaust purification catalyst 13 becomes greater than the $NO_x$ amount SN which corresponds to the boundary between the allowable lower limit temperature ST and the catalyst-specific lower limit temperature $ST_0$, that is, becomes greater than the above-mentioned small amount side range of change.

In this regard, if the engine speed rises and the amount of exhaust gas increases, the amount of $NO_x$ which is contained in the exhaust gas increases. On the other hand, if the amount of exhaust gas increases, the flow rate of the exhaust gas flowing through the inside of the exhaust purification catalyst 13 becomes faster and the $NO_x$ becomes harder to be stored in the exhaust purification catalyst 13. Therefore, if using the second $NO_x$ removal method at this time, a large amount of $NO_x$ slips through the exhaust purification catalyst 13, therefore, the $NO_x$ removal rate falls. On the other hand, using the first $NO_x$ removal method at this time sometimes gives a high $NO_x$ removal rate. Such a case arises when, in FIG. 16, in a state of a temperature lower than the lower limit temperature $ST_0$ where the amount of $NO_x$ is large. Therefore, even if the $NO_x$ removal rate falls, sometimes it is preferable to lower the lower limit temperature $ST_0$. Therefore, in the embodiment shown in FIG. 17, as the lower limit temperature $ST_0$, a temperature TC2 which is lower than the removal rate drop start temperature TC1 shown in FIG. 16 is used. This temperature TC2, as shown in FIG. 5, is the catalyst temperature TC at which the $NO_x$ removal rate R1 becomes 50 percent or less. Therefore, in the embodiment shown in FIG. 17, when the amount of $NO_x$ is large, even if the catalyst temperature TC is low as compared with the embodiment shown in FIG. 16, the first $NO_x$ removal method is used.

In the embodiment shown in FIG. 17 as well, the lower limit temperature $ST_0$ expresses the switching temperature ST at which an $NO_x$ removal method is switched from the second $NO_x$ removal method to the first $NO_x$ removal method. Therefore, in the embodiment shown in FIG. 17 as well, the switching temperature ST falls if the amount of $NO_x$ in the exhaust gas flowing into the exhaust purification catalyst 13 increases when the amount of $NO_x$ in the exhaust gas flowing, into the exhaust purification catalyst 13 is in the range of change at a small amount side within the range of change of the amount of $NO_x$ in the exhaust gas flowing into the exhaust purification catalyst 13, and the switching temperature ST is maintained at the catalyst-specific lower limit temperature $ST_0$ if the amount of $NO_x$ in the exhaust gas flowing into the exhaust purification catalyst 13 becomes greater than the $NO_x$ amount SN corresponding to the boundary between the allowable lower limit temperature ST and the catalyst-specific lower limit temperature $ST_0$, that is, becomes greater than the above-mentioned small amount side range of change.

Note that, depending on the exhaust purification catalyst 13, sometimes the switching temperature ST is made lower if the amount of $NO_x$ in the exhaust gas which flows into the exhaust purification catalyst 13 increases over the entire range of change of the amount of $NO_x$ in the exhaust gas flowing into the exhaust purification catalyst 13. If including also such a case, in the present invention, the switching temperature ST is made lower if the amount of $NO_x$ in the exhaust gas flowing into the exhaust purification catalyst 13 increases when at least the amount of $NO_x$ in the exhaust gas flowing into the exhaust purification catalyst 13 is in the range of change at a small amount side within the range of change of the amount of $NO_x$ in the exhaust gas flowing into the exhaust purification catalyst 13.

As stated up to here, in an embodiment according to the present invention, when the catalyst temperature TC is lower than the switching temperatures ST and $ST_0$, the second $NO_x$ removal method is used, while when the catalyst temperature TC is higher than the switching temperatures ST and $ST_0$, the first $NO_x$ removal method is used. In this case, the relationship between the switching temperatures ST and $ST_0$ and the amount of $NO_x$ in the exhaust gas flowing into the exhaust purification catalyst 13 is stored in advance in the ROM 32. Further, in an embodiment according to the present invention, a $NO_x$ removal method switching means is provided for switching an $NO_x$ removal method from the second $NO_x$ removal method to the first $NO_x$ removal method when the temperature of the exhaust purification catalyst 13 rises and exceeds a predetermined switching temperature ST. This $NO_x$ removal method switching means controls the switching temperature ST in accordance with the amount of $NO_x$ in the exhaust gas flowing into the exhaust purification catalyst 13 which amount of $NO_x$ changes in accordance with the engine operating state. In this case, in an embodiment according to the present invention, the electronic control unit 30 constitutes the $NO_x$ removal method switching means.

On the other hand, when the first $NO_x$ removal method is being used, if the oxygen concentration in the exhaust gas flowing into the exhaust purification catalyst 13 becomes higher, the $NO_2$ oxidation action is promoted, so $NO_x$ becomes easily stored in the basic layer 53. On the other hand, as explained above, if the catalyst temperature TC becomes high, $NO_x$ becomes hard to store in the basic layer 53. Therefore, when the oxygen concentration in the exhaust gas flowing into the exhaust purification catalyst 13 becomes higher, the danger of the $NO_x$ being stored in the basic layer 53 is eliminated if the catalyst temperature TC is high. Therefore, in another embodiment according to the present invention, as shown in FIG. 18, the switching temperature ST of the exhaust purification catalyst 13 at which temperature an $NO_x$ removal method is switched from the second $NO_x$ removal method to the first $NO_x$ removal method is made gradually higher as shown by ST1, ST2, and ST3 if the oxygen concentration in the exhaust gas flowing into the exhaust purification catalyst 13 becomes higher.

Note that, the oxygen concentration in the exhaust gas flowing into the exhaust purification catalyst 13 is proportional to the base air-fuel ratio AFB. This base air-fuel ratio AFB is stored as a function of the amount Q of injection from the fuel injector 3 and the engine speed N in the form of a map such as shown in FIG. 19A in advance in the ROM 32. In an embodiment according to the present invention, the relationship between the amount of rise ΔST of the switching temperature ST and the base air-fuel ratio AFB such as shown in FIG. 19B is set in advance, and the amount of rise ΔST of the switching temperature ST is calculated from this relationship. As will be understood from FIG. 19B, if the base air-fuel ratio AFB becomes high, the amount of rise ΔST of the switching temperature ST increases. Therefore, it will be understood that the switching temperature ST of the exhaust purification catalyst at which temperature an $NO_x$ removal method is switched from the second $NO_x$ removal method to the first $NO_x$ removal method is made higher as the base air-fuel ratio AFB becomes higher.

FIG. 20 shows the timing of injection of additional fuel WR, the timing of injection of hydrocarbons WT, the changes in the air-fuel ratio (A/F)in of the exhaust gas flowing into the exhaust purification catalyst 13, and the stored $NO_x$ amount ΣNOX which is stored in the exhaust purification catalyst 13 when an $NO_x$ removal action is switched from the $NO_x$ removal action by the second $NO_x$ removal method to the $NO_x$ removal action by the first $NO_x$ removal method. If an $NO_x$ removal action is switched from the $NO_x$ removal action by the second $NO_x$ removal method to the $NO_x$ removal action by the first $NO_x$ removal method in the state where $NO_x$ is stored in the exhaust purification catalyst 13, when the $NO_x$ removal action by the first $NO_x$ removal method is started, the $NO_x$ stored in the exhaust purification catalyst 13 will be released without being reduced. Therefore, in an embodiment according to the present invention, when an $NO_x$ removal action is switched from the $NO_x$ removal action by the second $NO_x$ removal method to the $NO_x$ removal action by the first $NO_x$ removal method, when $NO_x$ is stored in the exhaust purification catalyst 13, to release and reduce the stored $NO_x$, as shown in FIG. 20, additional fuel WR is fed and whereby the air-fuel ratio (A/F)in of the exhaust gas flowing into the exhaust purification catalyst 13 is made temporarily rich.

FIG. 21 shows the $NO_x$ purification control routine in the case of switching between the first $NO_x$ removal method and the second $NO_x$ removal method at the switching temperatures ST and $ST_0$ which are shown by the solid lines in FIG. 16 or FIG. 17. This routine is executed by interruption every fixed time interval.

Referring to FIG. 21, first, at step 60, the amount NOXA of $NO_x$ exhausted per unit time is calculated from the map shown in FIG. 13. Next, at step 61, the switching temperatures ST and $ST_0$ are calculated based on this amount NOXA of $NO_x$ exhausted per unit time from the relationship shown in FIG. 16 or FIG. 17. Next, the routine proceeds to step 62 where it is judged if the catalyst temperature TC of the exhaust purification catalyst 13 which is calculated based on the detection signal from the temperature sensor 23 is lower than the switching temperatures ST and $ST_0$. When it is judged that the catalyst temperature TC is lower than the switching temperatures ST and $ST_0$, the routine proceeds to step 63 where the $NO_x$ removal action by the second $NO_x$ removal method is performed.

That is, at step 63, the amount NOXA of $NO_x$ exhausted per unit time is added to $\Sigma NOX$ to thereby calculate the stored $NO_x$ amount $\Sigma NOX$. Next, at step 64, it is judged if the stored $NO_x$ amount $\Sigma NOX$ exceeds the allowable value MAX. When $\Sigma NOX > MAX$, the routine proceeds to step 65 where the additional amount of fuel WR is calculated from the map shown in FIG. 15 and the action of injection of additional fuel from the fuel injector 3 is performed. At this time, the air-fuel ratio of the exhaust gas flowing into the exhaust purification catalyst 13 is temporarily made rich. Next, at step 66, $\Sigma NOX$ is cleared.

On the other hand, when it is judged at step 62 that the catalyst temperature TC becomes higher than the switching temperatures ST and $ST_0$, the routine proceeds to step 67 where it is judged if the catalyst temperature TC has now become higher than the switching temperatures ST and $ST_0$. When it is judged at step 67 that the catalyst temperature TC has now become higher than the switching temperatures ST and $ST_0$, the routine proceeds to step 68 where it is judged if the stored $NO_x$ amount $\Sigma NOX$ is smaller than a constant value MIN. Note that, this constant value MIN is made a value considerably smaller than the allowable value MAX. When it is judged at step 68 that the stored $NO_x$ amount $\Sigma NOX$ is larger than the constant value MIN, the routine proceeds to step 69.

At step 69, to release and reduce the stored $NO_x$, the additional fuel WR corresponding to the stored $NO_x$ amount $\Sigma NOX$ is fed from the fuel injector 3 whereby the air-fuel ratio of the exhaust gas flowing into the exhaust purification catalyst 13 is temporarily made rich. Next, at step 70, $\Sigma NOX$ is cleared. On the other hand, when it is judged at step 67 that the catalyst temperature TC has not now become higher than the switching temperatures ST and $ST_0$ or when it is judged at step 68 that the stored $NO_x$ amount $\Sigma NOX$ is smaller than the constant value MIN, the routine proceeds to step 71 where the $NO_x$ removal action by the first $NO_x$ removal method is performed. At this time, hydrocarbons are injected from the hydrocarbon feed valve 15 in an amount WT which is calculated from the map shown in FIG. 11A by the injection period $\Delta T$ which is calculated from the map which is shown in FIG. 11B.

FIG. 22 shows the $NO_x$ purification control routine in the case of correcting the switching temperatures ST and $ST_0$ according to the base air-fuel ratio AFB as shown in FIG. 18 by the broken line. This routine is also executed by interruption every fixed time interval.

Referring to FIG. 22, first, at step 80, the amount NOXA of $NO_x$ exhausted per unit time is calculated from the map which is shown in FIG. 13. Next, at step 81, the base air-fuel ratio AFB is calculated from the map which is shown in FIG. 19A. Next, at step 82, the amount of rise $\Delta ST$ of the switching temperature ST corresponding to the base air-fuel ratio AFB is calculated from the relationship shown in FIG. 19B. Next, at step 83, the amount of rise $\Delta ST$ is added to the switching temperatures ST and $ST_0$ which are calculated from the relationship shown in FIG. 18 based on the amount NOXA of $NO_x$ exhausted per unit time to thereby calculate the final switching temperatures ST and $ST_0$. Next, the routine proceeds to step 84 where it is judged if the catalyst temperature TC of the exhaust purification catalyst 13 which is calculated based on the detection signal of the temperature sensor 23 is lower than the switching temperatures ST and $ST_0$. When it is judge that the catalyst temperature TC is lower than the switching temperatures ST and $ST_0$, the routine proceeds to step 85 where the $NO_x$ removal action by the second $NO_x$ removal method is performed.

That is, at step 85, the amount NOXA of $NO_x$ exhausted per unit time is added to $\Sigma NOX$ to thereby calculate the stored $NO_x$ amount $\Sigma NOX$. Next, at step 86, it is judged if the stored $NO_x$ amount $\Sigma NOX$ exceeds the allowable value MAX. When $\Sigma NOX > MAX$, the routine proceeds to step 87 where the additional amount of fuel WR is calculated from the map shown in FIG. 15 and the action of injection of additional fuel from the fuel injector 3 is performed. At this time, the air-fuel ratio of the exhaust gas flowing into the exhaust purification catalyst 13 is temporarily made rich. Next, at step 88, $\Sigma NOX$ is cleared.

On the other hand, when it is judged at step 84 that the catalyst temperature TC becomes higher than the switching temperatures ST and $ST_0$, the routine proceeds to step 89 where it is judged if the catalyst temperature TC has, now become higher than the switching temperatures ST and $ST_0$. When it is judged at step 89 that the catalyst temperature TC has now become higher than the switching temperatures ST and $ST_0$, the routine proceeds to step 90 where it is judged if the stored $NO_x$ amount $\Sigma NOX$ is smaller than the constant value MIN. When it is judged at step 90 that the stored $NO_x$ amount $\Sigma NOX$ is larger than the constant value MIN, the routine proceeds to step 91.

At step 91, to release and reduce the stored $NO_x$, additional fuel WR corresponding to the stored $NO_x$ amount $\Sigma NOX$ is fed from the fuel injector 3, and the air-fuel ratio of the exhaust gas flowing into the exhaust purification catalyst 13 is temporarily made rich. Next, at step 92, $\Sigma NOX$ is cleared. On the other hand, when it is judged at step 89 that the catalyst temperature TC has not now become higher than the switching temperatures ST and $ST_0$ or when it is judged at step 90 that the stored $NO_x$ amount $\Sigma NOX$ is smaller than the constant value MIN, the routine proceeds to step 93 where the $NO_x$ removal action by the first $NO_x$ removal method is performed. At this time, hydrocarbons are injected from the hydrocarbon feed valve 15 in an amount WT which is calculated from the map shown in FIG. 11A by the injection period $\Delta T$ which is calculated from the map shown in FIG. 11B.

Next, the $NO_x$ removal control when the acceleration operation is performed will be explained with reference to FIG. 23. In this FIG. 23, the switching temperatures $ST$ and $ST_0$ which are the same as the switching temperatures $ST$ and $ST_0$ shown in FIG. 17 are shown. Note that, below, the case where an acceleration operation is performed when in the operating state shown by the point C in FIG. 23 will be explained as an example. If an acceleration operation is performed and the engine speed is made to rapidly increase, the amount of the exhaust gas rapidly increases and the amount of $NO_x$ which is contained in the exhaust gas rapidly increases. Therefore, if an acceleration operation is performed, as shown by the point D of FIG. 23, usually an $NO_x$ removal method is immediately switched from the second $NO_x$ removal method to the first $NO_x$ removal method. FIG. 24 shows the change in the exhaust gas flow rate GW (g/s), the change of the inflowing $NO_x$ amount NW (g/s) which flows into the exhaust purification catalyst 13, and the change of the outflowing $NO_x$ amount MW (g/s) which flows out from the exhaust purification catalyst 13 when an acceleration operation is performed.

As shown in FIG. 24, if an acceleration operation is performed, the exhaust gas flow rate GW rapidly increases, the inflowing $NO_x$ amount NW rapidly increases, and, along with the increase in the inflowing $NO_x$ amount NW, the outflowing $NO_x$ amount MW increases. Note that, during the acceleration operation, the exhaust gas flow rate GW, inflowing $NO_x$ amount NW, and outflowing $NO_x$ amount MW temporarily are decreased because the switching of the gear ratios causes the engine speed to temporarily fall. Now then, the dash and dotted line A in the outflowing $NO_x$ amount MW of FIG. 24 shows the change in the outflowing $NO_x$ amount MW in the case of injecting hydrocarbons from the hydrocarbon feed valve 15 by the injection period $\Delta T$ at the time of steady state operation which is stored in the map of FIG. 11B. The state of injection of hydrocarbons from the hydrocarbon feed valve 15 at this time is shown in FIG. 25A. From FIG. 24, it will be understood that when an acceleration operation is performed, if injecting hydrocarbons from the hydrocarbon feed valve 15 by the injection period $\Delta T$ at the time of steady state operation which is stored in the map of FIG. 11B, the outflowing $NO_x$ amount MW will be considerably large.

That is, at the time of an acceleration operation, the exhaust gas flow rate GW is large, and at this time, even if injecting hydrocarbons from the hydrocarbon feed valve 15 by the injection period $\Delta T$ at the time of steady state operation which is stored in the map of FIG. 11B, the amount of hydrocarbons is not sufficient for reducing the large amount of $NO_x$ which is contained in the exhaust gas at this time. Therefore, at this time, a considerable amount of $NO_x$ slips through the exhaust purification catalyst 13. Therefore, as shown in FIG. 24 by the dash and dotted line A, the outflowing $NO_x$ amount MW becomes considerably large. In this case, to decrease the outflowing $NO_x$ amount MW, the amount of injection per unit time from the hydrocarbon feed valve 15 has to be increased. The broken line B in the outflowing $NO_x$ amount MW of FIG. 24 shows the case of increasing the amount of injection per unit time from the hydrocarbon feed valve 15 by increasing the amount of injection of hydrocarbons as shown in FIG. 25B. As will be understood from FIG. 24, in this case, the outflowing $NO_x$ amount MW does not change that much from the outflowing $NO_x$ amount MW in the case of injecting hydrocarbons from the hydrocarbon feed valve 15 by the injection period $\Delta T$ of steady state operation which is stored in the map of FIG. 11B. This is believed to be because even if increasing the amount of injection of hydrocarbons, the amount of hydrocarbons which slip through the exhaust purification catalyst 13 just increases and this does not contribute to the increase of the amount of generation of the reducing intermediate.

On the other hand, the solid line C in the outflowing $NO_x$ amount MW of FIG. 24, shows the case of increasing the amount of injection per unit time from the hydrocarbon feed valve 15 by shortening the injection period $\Delta T$ of the hydrocarbons to $\Delta TA$ as shown in FIG. 25C. In this case, as clear from FIG. 24, the outflowing $NO_x$ amount MW considerably decreases. That is, when the exhaust gas flow rate GW is large and, therefore, the flow rate of the exhaust gas flowing through the inside of the exhaust purification catalyst 13 is fast, a sufficient reaction time can no longer be secured compared with when the flow rate of the exhaust gas is slow. Therefore, the amount of generation of reducing intermediate is decreased. If the amount of generation of the reducing intermediate is decreased, the reducing intermediate reduces the $NO_x$ and is consumed a short time after generation. At this time, if shortening the injection period of hydrocarbons, reducing intermediate continues to be present on the exhaust purification catalyst 13. Therefore, it becomes possible to sufficiently reduce the $NO_x$ which is contained in the exhaust gas. Therefore, when the flow rate of the exhaust gas is fast, if shortening the injection period $\Delta T$ of the hydrocarbons as shown in FIG. 25C, the outflowing $NO_x$ amount MW is decreased as shown in FIG. 24 by the solid line C. Therefore, in an embodiment according to the present invention, when the flow rate of exhaust gas is fast, the injection period $\Delta T$ of the hydrocarbons is shortened.

Now, as the method of shortening the injection period $\Delta T$ of the hydrocarbons when an acceleration operation is being performed and the flow rate of the exhaust gas is fast, there are two methods: setting the injection period $\Delta T$ of the hydrocarbons short at the time of the operating state which is normally gone through when an acceleration operation is performed or shortening the injection period $\Delta T$ of the hydrocarbons when an acceleration operation is being performed or when the flow rate of exhaust gas is fast. FIG. 26A and FIG. 26B show the former method, that is, the method of setting the injection period $\Delta T$ of the hydrocarbons short in the operating region which is normally gone through when an acceleration operation is performed. Note that, FIG. 26A shows equivalent injection period lines the same as in FIG. 11A, while FIG. 26B shows a map of the injection period $\Delta T$ the same as the map shown in FIG. 11A.

Referring to FIG. 26A, FIG. 26A shows by arrows the typical patterns of change in the amount Q of injection from the fuel injector 3 and the engine speed N at the time of acceleration operation. That is, if an acceleration operation is performed at the time of the operating state of the point C, the amount Q of injection from the fuel injector 3 rapidly increases and the engine speed N rapidly rises, so the operating state becomes one which is shown by the point D. Next, if returning to the steady state operating state, the amount Q of injection from the fuel injector 3 is decreased and the engine speed N falls, so the operating state becomes one as shown by the point E. In this case, in the example which is shown in FIG. 26A, the point D is the operating state normally gone through when an acceleration operation is performed, and the high load medium-high speed region which is shown in FIG. 26A by the hatching H is the operating region which is normally gone through when an acceleration operation is performed.

In this embodiment, the injection period ΔT of hydrocarbons in this high load medium-high speed region H is set shorter than the injection period ΔT at an equivalent injection period line other than at this high load medium-high speed region H, and the injection period ΔT at the region H of the map corresponding to this high load medium-high speed region H becomes this short set injection period ΔT. In this embodiment, the injection period ΔT in the high load medium-high speed region H which is normally gone through when an acceleration operation is performed is made shorter, so when an acceleration operation is performed, the injection period ΔT is made shorter. Therefore, when an acceleration operation is performed, a good $NO_x$ removal rate can be secured.

Next, the method of shortening the injection period ΔT of the hydrocarbons when an acceleration operation is being performed or when the flow rate of the exhaust gas is fast will be explained. As will be understood from FIG. 24, shortening the injection period ΔT of the hydrocarbons results in the outflowing $NO_x$ amount MW being decreased when the exhaust gas flow rate GW is large and the flow rate of the exhaust gas is fast. Therefore, in the first example, the injection period ΔT of the hydrocarbons from the hydrocarbon feed valve 15 is made shorter when the amount of the exhaust gas flowing into the exhaust purification catalyst 13 is large compared to when the amount of the exhaust gas flowing into the exhaust purification catalyst 13 is small. Specifically speaking, in this first example, when the outflowing $NO_x$ amount MW exceeds the predetermined exhaust gas flow rate GX, the injection period ΔT of the hydrocarbons is shortened.

As the $NO_x$ purification control routine for using this first example, a routine changed in the part which is surrounded by the dashed and dotted line F in FIG. 22 is used. FIG. 27 shows only the part changed for using the first example in FIG. 22.

If explaining the part which is surrounded by the dashed and dotted line F in FIG. 27, first, at step 100, it is judged if the exhaust gas flow rate GW exceeds a predetermined exhaust gas flow rate GX. When the exhaust gas flow rate GW does not exceed the predetermined exhaust gas flow rate GX, the routine proceeds to step 80 where the amount NOXA of $NO_x$ exhausted per unit time is calculated from the map which is shown in FIG. 13. Next, the routine proceeds to step 81 of FIG. 22. As opposed to this, when it is judged at step 100 that the exhaust gas flow rate GW exceeds the predetermined exhaust gas flow rate GX, the routine proceeds to step 101 where the amount WT of injection of hydrocarbons from the hydrocarbon feed valve 15 at the time of steady state operation is calculated from the map shown in FIG. 11A. Next, at step 102, the injection period ΔT of the hydrocarbons is made the predetermined short injection period ΔTA such as shown in FIG. 25C. At this time, hydrocarbons are injected from the hydrocarbon feed valve 15 in an amount WTA of injection which was calculated at step 101 by the injection period ΔTA.

Next, a second example of using the method of shortening the injection period ΔT of the hydrocarbons when an acceleration operation is being performed or when the flow rate of exhaust gas is fast will be explained. As will be understood from FIG. 24, shortening the injection period ΔT of the hydrocarbons results in the outflowing $NO_x$ amount MW being decreased when the exhaust gas flow rate GW is large and the flow rate of the exhaust gas is fast. Further, at this time, the outflowing $NO_x$ amount MW can be effectively decreased when the inflowing $NO_x$ amount NW is large. Therefore, in this second example, the injection period ΔT of the hydrocarbons from the hydrocarbon feed valve 15 is shortened when the amount of $NO_x$ in the exhaust gas flowing into the exhaust purification catalyst 13 is large and the amount of the exhaust gas flowing into the exhaust purification catalyst 13 is large. Specifically speaking, in this second example, the injection period ΔT of the hydrocarbons is shortened when the inflowing $NO_x$ amount NW exceeds the predetermined inflowing $NO_x$ amount NX and the exhaust gas flow rate GW exceeds the predetermined exhaust gas flow rate GX.

As the $NO_x$ removal control routine for using this second example as well, a routine changed in the part which is surrounded by the dashed and dotted line F in FIG. 22 is used. FIG. 28 shows only the part changed for using the second example in FIG. 22.

If explaining the part which is surrounded by the dashed and dotted line F in FIG. 28, first, at step 100, it is judged if the inflowing $NO_x$ amount NW exceeds a predetermined inflowing $NO_x$ amount NX. When the inflowing $NO_x$ amount NW does not exceed the predetermined inflowing $NO_x$ amount NX, the routine proceeds to step 80 where the amount NOXA of $NO_x$ exhausted per unit time is calculated from the map shown in FIG. 13. Next, the routine proceeds to step 81 of FIG. 22. As opposed to this, when it is judged at step 100 that the inflowing $NO_x$ amount NW exceeds the predetermined inflowing $NO_x$ amount NX, the routine proceeds to step 101 where it is judged if the exhaust gas flow rate GW exceeds a predetermined exhaust gas flow rate GX.

When it is judged at step 101 that the exhaust gas flow rate GW does not exceed the predetermined exhaust gas flow rate GX, the routine proceeds to step 80, then the routine proceeds to step 81 of FIG. 22. As opposed to this, when it is judged at step 101 that the exhaust gas flow rate GW exceeds the predetermined exhaust gas flow rate GX, the routine proceeds to step 102 where the amount WT of injection of hydrocarbons from the hydrocarbon feed valve 15 at the time of steady state operation is calculated from the map shown in FIG. 11A. Next at step 103, the injection period ΔT of the hydrocarbons is made the predetermined short injection period ΔTA such as shown in FIG. 25C. At this time, hydrocarbons are injected from the hydrocarbon feed valve 15 in an amount WT of injection which was calculated at step 102 by the injection period ΔTA.

Next, a third example of using the method of shortening the injection period ΔT of the hydrocarbons when an acceleration operation is being performed or when the flow rate of exhaust gas is fast will be explained. In this third example, at the time of acceleration operation of the vehicle, the injection period ΔT of the hydrocarbons from the hydrocarbon feed valve 15 is shortened. Note that, in this third example, for example, it is judged whether an acceleration operation is being performed from the speed of change of the amount of depression of the accelerator pedal 40. When the speed of change of the amount of depression of the accelerator pedal 40 is larger than a predetermined speed of change, it is judged that an acceleration operation is being performed.

As the $NO_x$ removal control routine for using this third example as well, a routine changed in the part which is surrounded by the dashed and dotted line F in FIG. 22 is used. FIG. 29 shows only the part changed for using the third example in FIG. 22.

If explaining the part which is surrounded by the dashed and dotted line F in FIG. 29, first, at step 100, it is judged if an acceleration operation is being performed. When an acceleration operation is not being performed, the routine proceeds to step 80 where the amount NOXA of $NO_x$ exhausted per unit time is calculated from the map shown in FIG. 13. Next, the routine proceeds to step 81 of FIG. 22. As opposed to this, when it is judged at step 100 that an acceleration operation is being performed, the routine proceeds to step 101 where the amount WT of injection of hydrocarbons from the hydrocarbon feed valve 15 at the time of steady state operation is calculated from the map shown in FIG. 11A. Next, at step 102, the injection period ΔT of the hydrocarbons is made the predetermined short injection period ΔTA such as shown in FIG. 25C. At this time, hydrocarbons are injected from the hydrocarbon feed valve 15 in an amount WT of injection which was calculated at step 101 by the injection period ΔTA.

Note that, as another embodiment, it is also possible to arrange an oxidation catalyst for reforming hydrocarbons in the engine exhaust passage upstream of the exhaust purification catalyst 13.

REFERENCE SIGNS LIST

4 intake manifold
5 exhaust manifold
7 exhaust turbocharger
12 exhaust pipe
13 exhaust purification catalyst
14 particulate filter
15 hydrocarbon feed valve

What is claimed is:

1. An exhaust purification system for an internal combustion engine, the exhaust purification system comprising:
   an exhaust purification catalyst arranged in an engine exhaust passage; a hydrocarbon feed valve arranged in the engine exhaust passage upstream of the exhaust purification catalyst;
   a precious metal catalyst being carried on an exhaust gas flow surface of the exhaust purification catalyst;
   a basic layer provided around the precious metal catalyst; and an electronic control unit configured to:
   perform a first $NO_x$ removal method which reduces $NO_x$ contained in an exhaust gas by a reducing intermediate, the reducing intermediate being held on the basic layer and generated by injecting hydrocarbons from the hydrocarbon feed valve within a predetermined range of period,
   perform a second $NO_x$ removal method in which an air-fuel ratio of the exhaust gas flowing into the exhaust purification catalyst is made rich by a period which is longer than the predetermined range to make $NO_x$ which was stored in the exhaust purification catalyst when the air-fuel ratio of the exhaust gas was lean be released from the exhaust purification catalyst and be reduced,
   switch an $NO_x$ removal method from the second $NO_x$ removal method to the first $NO_x$ removal method when a temperature of the exhaust purification catalyst rises and the temperature exceeds a predetermined switching temperature, and
   control the predetermined switching temperature in accordance with an amount of $NO_x$ in the exhaust gas flowing into the exhaust purification catalyst, which amount of $NO_x$ changes in accordance with an engine operating state, the predetermined switching temperature being made lower if the amount of NO in the exhaust gas flowing into the exhaust purification catalyst increases at least when the amount of $NO_x$ in an inflowing exhaust gas is in a range of change at a small amount side within a range of change of the amount of $NO_x$ in the inflowing exhaust gas.

2. The exhaust purification system for the internal combustion engine as claimed in claim 1, wherein
   a lower limit temperature of the exhaust purification catalyst at which the first $NO_x$ removal method is performed is set, and
   the lower limit temperature is set as the predetermined switching temperature when the amount of $NO_x$ in the inflowing exhaust gas is larger than the range of change at the small amount side.

3. The exhaust purification system for the internal combustion engine as claimed in claim 2, wherein
   the exhaust purification catalyst has a removal rate drop start temperature at which a $NO_x$ removal rate starts to fall when the temperature of the exhaust purification catalyst falls when the first $NO_x$ removal method is performed, and
   the removal rate drop start temperature is set as the lower limit temperature.

4. The exhaust purification system for the internal combustion engine as claimed in claim 2, wherein
   the exhaust purification catalyst has a removal rate drop start temperature at which a $NO_x$ removal rate starts to fall when the temperature of the exhaust purification catalyst falls when the first $NO_x$ removal method is performed, and
   the lower limit temperature is lower than the removal rate drop start temperature.

5. The exhaust purification system for the internal combustion engine as claimed in claim 1, wherein when the first $NO_x$ removal method is being performed, an injection period of hydrocarbons from the hydrocarbon feed valve is made shorter the greater the amount of $NO_x$ in the exhaust gas flowing into the exhaust purification catalyst.

6. The exhaust purification system for the internal combustion engine as claimed in claim 1, wherein an injection period of hydrocarbons from the hydrocarbon feed valve is made shorter when an amount of exhaust gas flowing into the exhaust purification catalyst is large as compared to a injection period when the amount of exhaust gas flowing into the exhaust purification catalyst is small.

7. The exhaust purification system for the internal combustion engine as claimed in claim 1, wherein an injection period of hydrocarbons from the hydrocarbon feed valve is made shorter period when the amount of $NO_x$ in the exhaust gas flowing into the exhaust purification catalyst is greater than a first predetermined amount and an amount of exhaust gas flowing into the exhaust purification catalyst is greater than a second predetermined amount.

8. The exhaust purification system for the internal combustion engine as claimed in claim 1, wherein at the time of acceleration operation of a vehicle, an injection period of hydrocarbons from the hydrocarbon feed valve is made shorter.

9. The exhaust purification system for the internal combustion engine as claimed in claim 1, wherein the predetermined switching temperature of the exhaust purification catalyst, at which the electronic control unit is configured to switch the $NO_x$ removal method from the second $NO_x$ removal method to the first $NO_x$ removal method, is made higher when an oxygen concentration in the exhaust gas flowing into the exhaust purification catalyst becomes high.

10. The exhaust purification system for the internal combustion engine as claimed in claim 9, wherein the predetermined switching temperature of the exhaust purification catalyst, at which the electronic control unit is configured to switch the $NO_x$ removal method from the second $NO_x$ removal method to the first $NO_x$ removal method, is made higher when a base air-fuel ratio becomes high.

* * * * *